(12) United States Patent
Soryal et al.

(10) Patent No.: US 11,677,275 B2
(45) Date of Patent: *Jun. 13, 2023

(54) WIRELESS POWER TRANSFER NETWORK MANAGEMENT

(71) Applicant: AT&T Intellectual Property I, L.P., Atlanta, GA (US)

(72) Inventors: Joseph Soryal, Ridgewood, NY (US); Naila Jaoude, Eatontown, NJ (US); Samuel N. Zellner, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/106,285

(22) Filed: Nov. 30, 2020

(65) Prior Publication Data

US 2021/0104920 A1 Apr. 8, 2021

Related U.S. Application Data

(63) Continuation of application No. 16/428,078, filed on May 31, 2019, now Pat. No. 10,879,741.

(51) Int. Cl.
*H02J 50/30* (2016.01)
*H04B 5/00* (2006.01)
(Continued)

(52) U.S. Cl.
CPC ............. *H02J 50/30* (2016.02); *H02J 50/80* (2016.02); *H04B 5/0037* (2013.01); *H04W 4/029* (2018.02); *H04W 16/28* (2013.01)

(58) Field of Classification Search
CPC ......... H02J 50/30; H02J 50/80; H04W 4/029; H04W 16/28; H04B 5/0037
See application file for complete search history.

(56) References Cited

U.S. PATENT DOCUMENTS 7,068,991 B2   6/2006 Parise
8,278,881 B2  10/2012 Woody et al.
(Continued)

FOREIGN PATENT DOCUMENTS

CN   104967155   10/2015
CN   104979872   11/2017

OTHER PUBLICATIONS

Belkin, "What's Next for Wireless Charging?," retrieved at <https://www.belkin.com/us/resource-center/wireless-charging/whats-next/> on May 6, 2019.

(Continued)

*Primary Examiner* — Christopher M Brandt
(74) *Attorney, Agent, or Firm* — Hartman & Citrin LLC

(57) ABSTRACT

Concepts and technologies directed to wireless power transfer network management are disclosed herein. Embodiments of a system can include an optical beamforming transmitter, a processor, and a memory that stores computer-executable instructions that configure a processor to perform operations. The operations can include receiving a power charge message that requests wireless power transfer to charge a battery system of a wirelessly chargeable equipment. The operations can include detecting that the wirelessly chargeable equipment is within a power transfer range of the optical beamforming transmitter. The operations can include determining that the wirelessly chargeable equipment is not stationary. The operations can include tracking movement of the wirelessly chargeable equipment and activating the optical beamforming transmitter that provides wireless power transfer to the wirelessly chargeable equipment while the wirelessly chargeable equipment is within the power transfer range.

17 Claims, 7 Drawing Sheets

(51) Int. Cl.
*H02J 50/80* (2016.01)
*H04W 4/029* (2018.01)
*H04W 16/28* (2009.01)

(56) References Cited

U.S. PATENT DOCUMENTS

| | | | | |
|---|---|---|---|---|
| 9,685,798 | B2 | 6/2017 | Appelbaum et al. | |
| 10,093,194 | B2 | 10/2018 | Hyde et al. | |
| 10,443,262 | B2* | 10/2019 | Evans | B60L 53/30 |
| 10,742,329 | B2* | 8/2020 | Hiller | H04B 10/80 |
| 2003/0075670 | A1* | 4/2003 | Tuominen | H02J 50/30 250/205 |
| 2007/0206958 | A1* | 9/2007 | Chen | H01Q 3/2676 398/183 |
| 2016/0336815 | A1* | 11/2016 | Alperin | H02J 7/00034 |
| 2016/0368387 | A1* | 12/2016 | Pavlovsky | B60L 53/122 |
| 2018/0056800 | A1* | 3/2018 | Meichle | H04B 5/0037 |
| 2018/0090966 | A1* | 3/2018 | Grover | H02J 50/80 |
| 2018/0175672 | A1* | 6/2018 | Yoden | H02J 50/05 |
| 2018/0307226 | A1 | 10/2018 | Chase et al. | |
| 2019/0199139 | A1* | 6/2019 | Perry | H02J 50/12 |
| 2020/0140247 | A1* | 5/2020 | Jaipaul | H02J 7/00712 |

OTHER PUBLICATIONS

Cawley, Conor, "A World Without Wires: the Future of Wireless Charging," tech.co, Apr. 9, 2018, < https://tech.co/news/world-without-wires-wireless-charging-2018-04 >.

Maglaras et al., "Dynamic wireless charging of electric vehicles on the move with Mobile Energy Disseminators," IJACSA, Jun. 2015, vol. 6, No. 6, p. 239-251.

Disney Research, "Wireless power transmission safely charges devices anywhere within a room," Feb. 16, 2017, < https://phys.org/news/2017-02-wireless-power-transmission-safely-devices.html#jCp >.

Wi-Charge, "OEM-Ready Wireless Power Modules," Wi-Charge.com, retrieved at < https://wi-charge.com/product_category/oem-ready-embedded-wireless-power-modules/ > on May 6, 2019.

Wouk, Kris, "Ventev's Scott Franklin on The Future of Wireless Charging," Digital Trends, Jan. 10, 2018, < https://www.digitaltrends.com/mobile/ventev-scott-franklin-wireless-charge-stand-ces-2018/ >.

Staff Writer, "WattUp: The Future of Wireless Charging," PC Tech Magazine, Jan. 16, 2018, < https://pctechmag.com/2018/01/wattup-the-future-of-wireless-charging/ >.

U.S. Office Action dated May 13, 2020 in U.S. Appl. No. 16/428,078.
U.S. Notice of Allowance dated Sep. 11, 2020 in U.S. Appl. No. 16/428,078.

* cited by examiner

WIRELESS POWER TRANSFER NETWORK MANAGEMENT

CROSS-REFERENCE TO RELATED APPLICATIONS

This application is a continuation of and claims priority to U.S. patent application Ser. No. 16/428,078, entitled "Wireless Power Transfer Network Management," filed May 31, 2019, now U.S. Pat. No. 10,879,741, which is incorporated herein by reference in its entirety.

BACKGROUND

Historically, vehicles have operated using combustion as a primary power source to drive movement. In recent years, an increasing number of vehicles and user equipment utilize electric motors to drive movement. As such, many vehicles and other user equipment incorporate battery systems that store an electric charge for later use. Yet the amount of power which can be stored by battery systems is finite, and thus when a vehicle or other user equipment draws from the battery system store, the power is depleted. Electric vehicles and devices (e.g., full electric vehicles, hybrid vehicles, electric scooters, mobile devices, etc.) may have limited operating distance and/or time depending on the manner in which each device is used. Although infrastructure for replenishing electric vehicles and devices is increasing, there still exists the possibility that a user becomes stranded between designated electric re-charging stations or hubs. Extended periods away from a power source can, in some instances, cause an electric vehicle and/or device to lose electric charge, such as through electrical parasitic loss. Additionally, users who rely on a vehicle's battery system to recharge user equipment (e.g., a mobile phone, tablet, smart device, etc.) can increase the power draw from the battery system, and in turn deplete the current electric charge.

SUMMARY

The present disclosure is directed to wireless power transfer network management, according to various embodiments. According to one aspect of the concepts and technologies disclosed herein, a system is disclosed. In some embodiments, the system can include or otherwise be provided by a network server, a network edge device, a wireless power transfer assembly, a network access point, a combination thereof, or the like. The system can be communicatively coupled to a network. In some embodiments, the system can include an optical beamforming transmitter, a processor, and a memory. The memory can store computer-executable instructions that, in response to execution by the processor, cause the processor to perform operations. In some embodiments, the operations can include receiving a power charge message. The power charge message can request wireless power transfer to charge a battery system of a wirelessly chargeable equipment. In some embodiments, the power charge message can include a wirelessly chargeable equipment identifier and a location identifier. The operations can further include detecting that the wirelessly chargeable equipment is within a power transfer range of the optical beamforming transmitter. In some embodiments, the operations can include determining that the wirelessly chargeable equipment is not stationary. In some embodiments, the operations can include tracking movement of the wirelessly chargeable equipment. In some embodiments, the operations can further include obtaining a current charge profile corresponding to the wirelessly chargeable equipment, where the current charge profile can include a charge criticality indicator and a current charge level.

In some embodiments, the operations can include determining whether the wirelessly chargeable equipment is authorized to receive the wireless power transfer. In some embodiments, the operations can include activating the optical beamforming transmitter that provides wireless power transfer to the wirelessly chargeable equipment while the wirelessly chargeable equipment is within the power transfer range. In some embodiments, activating the optical beamforming transmitter can occur after determining that the wirelessly chargeable equipment is authorized to receive the wireless power transfer.

In some embodiments, the operations can include generating, prior to the wirelessly chargeable equipment leaving the power transfer range, a charge preparation command that is directed to a downstream wireless power transfer assembly that is located outside of the power transfer range. In some embodiments, the downstream wireless power transfer assembly can include another optical beamforming transmitter to provide another instance of wireless power transfer once the wirelessly chargeable equipment leaves the power transfer range. In some embodiments, the operations can include providing the charge preparation command to the downstream wireless power transfer assembly that is located outside of the power transfer range. In various embodiments, the charge preparation command can instruct the downstream wireless power transfer assembly to prepare to provide wireless power transfer for the wirelessly chargeable equipment. In some embodiments, the operations can include confirming a direct line of sight with the wirelessly chargeable equipment. In some embodiments, the optical beamforming transmitter can be activated responsive to confirming a direct line of sight with the wirelessly chargeable equipment.

According to another aspect of the concepts and technologies disclosed herein, a method is disclosed according to an embodiment. In various embodiments, the method may be performed by a system that includes an optical beamforming transmitter. In some embodiments, the system can be configured as a network edge device, where the optical beamforming transmitter is provided by a wireless power transfer assembly of the network edge device. In some embodiments, the network edge device can also include a network access point. In various embodiments, the method can include receiving, by a system that provides an optical beamforming transmitter, a power charge message. The power charge message can request wireless power transfer to charge a battery system of a wirelessly chargeable equipment. In some embodiments, the power charge message can include a wirelessly chargeable equipment identifier and a location identifier. The method can further include detecting, by the system, that the wirelessly chargeable equipment is within a power transfer range of the optical beamforming transmitter. In some embodiments, the method can include determining, by the system, that the wirelessly chargeable equipment is not stationary. In some embodiments, the method can include tracking, by the system, movement of the wirelessly chargeable equipment. In some embodiments, the method can further include obtaining, by the system, a current charge profile corresponding to the wirelessly chargeable equipment, where the current charge profile can include a charge criticality indicator and a current charge level.

In some embodiments, the method can include determining, by the system, whether the wirelessly chargeable equipment is authorized to receive the wireless power transfer. In some embodiments, the method can include activating, by the system, the optical beamforming transmitter that provides wireless power transfer to the wirelessly chargeable equipment while the wirelessly chargeable equipment is within the power transfer range. In some embodiments, activating the optical beamforming transmitter can occur after determining that the wirelessly chargeable equipment is authorized to receive the wireless power transfer.

In some embodiments, the method can include generating, by the system, prior to the wirelessly chargeable equipment leaving the power transfer range, a charge preparation command that is directed to a downstream wireless power transfer assembly that is located outside of the power transfer range. In some embodiments, the downstream wireless power transfer assembly can include another optical beamforming transmitter to provide wireless power transfer once the wirelessly chargeable equipment leaves the power transfer range. In some embodiments, the method can include providing the charge preparation command to the downstream wireless power transfer assembly that is located outside of the power transfer range. In various embodiments, the charge preparation command can instruct the downstream wireless power transfer assembly to prepare to provide wireless power transfer for the wirelessly chargeable equipment. In some embodiments, the method can include confirming, by the system, a direct line of sight with the wirelessly chargeable equipment. In some embodiments, the optical beamforming transmitter can be activated responsive to confirming a direct line of sight with the wirelessly chargeable equipment.

According to another aspect of the concepts and technologies disclosed herein, a computer storage medium is disclosed according to an embodiment. The computer storage medium can have computer-executable instructions stored thereon that, in response to execution by a processor of a system, cause the processor to perform operations. In some embodiments, the system can include an optical beamforming transmitter. The operations can include receiving a power charge message. The power charge message can request wireless power transfer to charge a battery system of a wirelessly chargeable equipment. In some embodiments, the power charge message can include a wirelessly chargeable equipment identifier and a location identifier. The operations can further include detecting that the wirelessly chargeable equipment is within a power transfer range of the optical beamforming transmitter. In some embodiments, the operations can include determining that the wirelessly chargeable equipment is not stationary. In some embodiments, the operations can include tracking movement of the wirelessly chargeable equipment. In some embodiments, the operations can further include obtaining a current charge profile corresponding to the wirelessly chargeable equipment, where the current charge profile can include a charge criticality indicator and a current charge level.

In some embodiments, the operations can include determining whether the wirelessly chargeable equipment is authorized to receive the wireless power transfer. In some embodiments, the operations can include activating the optical beamforming transmitter that provides wireless power transfer to the wirelessly chargeable equipment while the wirelessly chargeable equipment is within the power transfer range. In some embodiments, activating the optical beamforming transmitter can occur after determining that the wirelessly chargeable equipment is authorized to receive the wireless power transfer.

In some embodiments, the operations can include generating, prior to the wirelessly chargeable equipment leaving the power transfer range, a charge preparation command that is directed to a downstream wireless power transfer assembly that is located outside of the power transfer range. In some embodiments, the downstream wireless power transfer assembly can include another optical beamforming transmitter to provide wireless power transfer once the wirelessly chargeable equipment leaves the power transfer range. In some embodiments, the operations can include providing the charge preparation command to the downstream wireless power transfer assembly that is located outside of the power transfer range. In various embodiments, the charge preparation command can instruct the downstream wireless power transfer assembly to prepare to provide wireless power transfer for the wirelessly chargeable equipment. In some embodiments, the operations can include confirming a direct line of sight with the wirelessly chargeable equipment. In some embodiments, the optical beamforming transmitter can be activated responsive to confirming the direct line of sight with the wirelessly chargeable equipment.

It should be appreciated that the above-described subject matter may be implemented as a computer-controlled apparatus, a computer process, a computing system, a method, or as an article of manufacture such as a computer storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
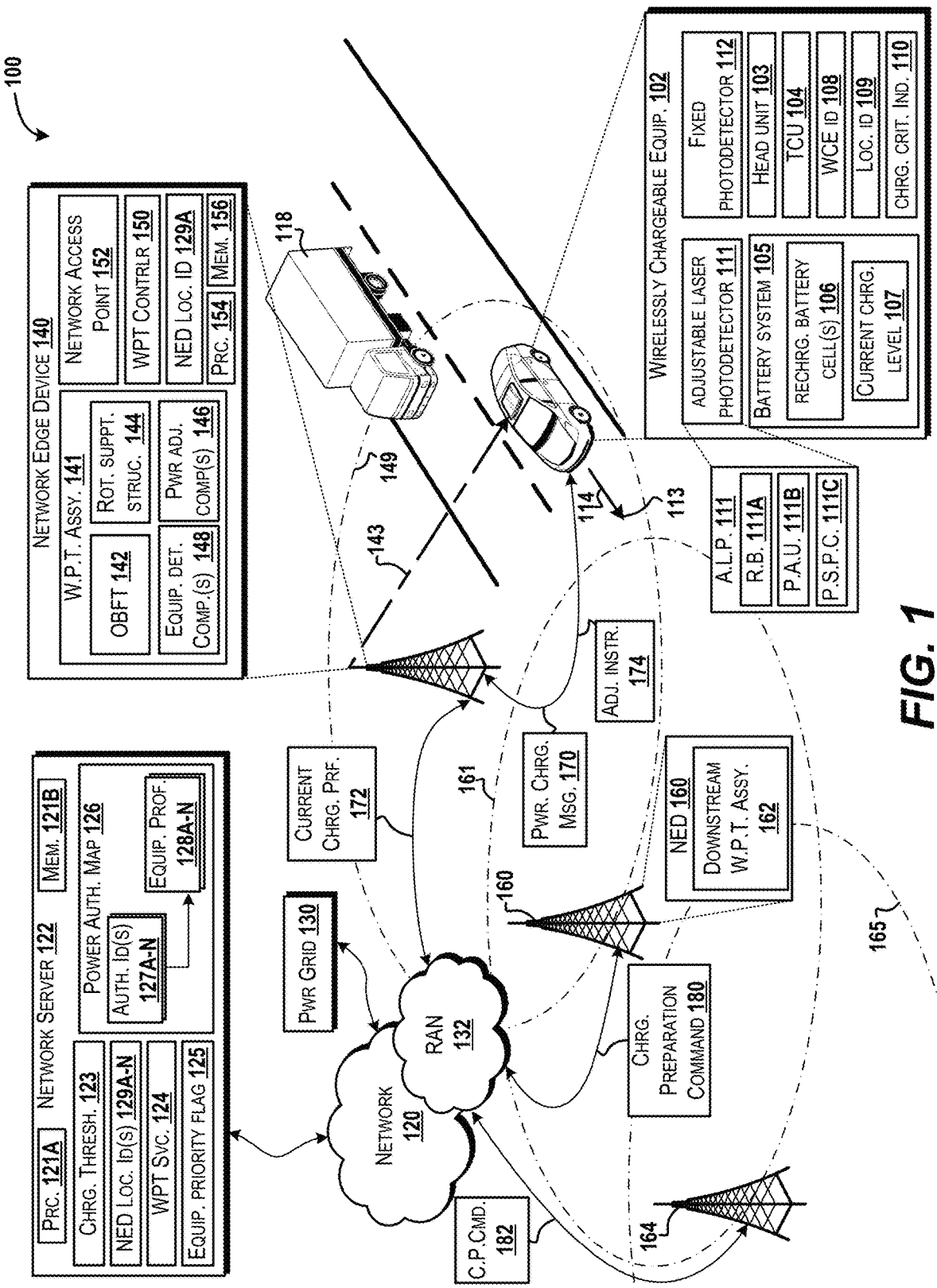
FIG. 1 is a block diagram illustrating an example operating environment for implementing wireless power transfer network management, according to an illustrative embodiment.

The following detailed description is directed to wireless power transfer network management that facilitates direct, individualized wireless power transfer to rechargeable equipment that is non-stationary and/or stationary, according to various embodiments. Traditional attempts at providing power transfer to electric vehicles and/or other rechargeable equipment typically require a vehicle and/or device to be stationary and physically attached to a power cable for an extended period of time. As such, the physical coupling of a power cable for power delivery can limit the mobility of the user depending on the length of the power cable. When a user is at home and/or at work for extended periods of time, the electric vehicle and/or device may be stationary, and thus restrictions regarding the mobility of the electric vehicle and/or device may not bother the user. In addition to physical power cables limiting physical movement, the power cables themselves can exhibit wear over time due to repeated use. Moreover, the physical design of a connector interface for the power cable may need to be designed for uniformity across various manufacturers, thereby complicating the design process and increasing costs.

Some traditional attempts at wireless power transfer, that is power transfer without relying on attachment to a physical cable, have used electromagnetic induction in near-field and/or far-field scenarios. For example, some attempts at providing wireless power transfer to an electric vehicle require that the vehicle be parked over an induction power transmitter that is embedded or otherwise buried in the ground. Other traditional attempts may provide an induction power transmitter located on the ceiling of a room such that when a user brings their mobile device into the room, the mobile device is charged via the electromagnetic field produced by the induction transmitter. Yet use of an induction transmitter for wireless power transfer can provide significant technical challenges because all wirelessly chargeable devices that are located within the electromagnetic field of the induction transmitter will have an opportunity to receive wireless power transfer. This is because wireless power transfer systems which use an induction transmitter typically cannot distinguish target devices from other devices and provide isolated wireless power transfer to a particular device when multiple devices are located next to each other. Therefore, wireless power transfer systems that utilize an induction transmitter may inadvertently provide power transfer to devices and/or vehicles that are not authorized by a service provider to receive the power transfer because these devices are located within the electromagnetic field. Therefore, managing and providing wireless power transfer in large scale operations by relying solely on electromagnetic induction may present significant technical challenges when conventional techniques and conventional systems are utilized.

As such, embodiments of the present disclosure provide concepts and technology for wireless power transfer network management that facilitates direct, individualized wireless power transfer to rechargeable equipment that is non-stationary and/or stationary. The concepts and technologies discussed herein can enable wirelessly chargeable equipment (e.g., an electric vehicle, a remote controlled device, a mobile phone that is in motion, or another user equipment that is configured for wireless power transfer) to receive wireless power transfer via the use of an optical beamforming transmitter. Embodiments of the present disclosure can provide components which enable device recognition and movement tracking so that wireless power transfer can be provided by the optical beamforming transmitter while the wirelessly chargeable equipment is within a power transfer range. The concepts and technologies discussed herein can provide a plurality of network edge devices that include an optical beamforming transmitter and are configured to communicate with each other to facilitate continuous, selective wireless power transfer to the wirelessly chargeable equipment as the wirelessly chargeable equipment moves between the network edge devices. The network edge devices can collectively form a wireless power transfer network that enables far field wireless power transfer to specific wirelessly chargeable equipment. In some embodiments, a network edge device can serve as a wireless power transfer node via an optical beamforming transmitter, and also serve as a network communication access point for a mobile network, such as by including components of a base transceiver station, an eNodeB, a gNodeB, or other network communication node. By this, a communication service provider can identify and selectively authorize wirelessly chargeable equipment to receive wireless power transfer without sole reliance on an induction transmitter. Therefore, various concepts and technologies of embodiments discussed herein can improve the functioning of wirelessly chargeable equipment by providing increased operating range through selective wireless power transfer, while also mitigating waste of electrical resources by authorizing wireless power transfer to specific wirelessly chargeable equipment. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, vehicle computer systems, network access nodes, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein pertaining to a network edge device that provides or otherwise facilitates network management for wireless power transfer will be described, according to an illustrative embodiment. It should be understood that the operating environment 100 and the various components thereof have been illustrated for clarity purposes to simplify the manner of discussion. Accordingly, additional and/or alternate components can be made available or otherwise implemented within the operating environment 100 without departing from the embodiments described herein. As such, the manner of discussion is provided such that one of ordinary skill in the technology can implement one or more embodiments described herein.

The operating environment 100 shown in FIG. 1 includes a plurality of wirelessly chargeable devices ("WCEs"), such as a WCE 102 and a WCE 118, a plurality of network edge devices ("NED"), such as NEDs 140, 160, and 164, a communications network ("network") 120, a network server 122, a power grid 130, and one or more instance of a radio access network ("RAN") 132. The number of instances shown in FIG. 1 is for illustration purposes only and should not be construed as limiting in any way. Therefore, it is understood that zero, one, two, or more instances of each of the components shown in FIG. 1 may be provided in various embodiments.

In the operating environment 100 shown in FIG. 1, the plurality of WCEs (e.g., the WCE 102, 118) are illustrated as being configured as rechargeable electric vehicles driving along a paved roadway, although this may not necessarily be the case for all embodiments. As used herein, the term "wirelessly chargeable equipment" (e.g., any of the WCEs 102, 118) refers to any device and/or machine that has a rechargeable battery unit (e.g., a battery system with rechargeable battery cells as discussed below in further detail) and is configured to receive wireless power transfer from an optical beamforming transmitter such that the optical beamforming transmitter provides or otherwise facilitates energy transfer to recharge the battery system of the wirelessly chargeable equipment. More specifically, various embodiments of the wirelessly chargeable equipment are configured to receive on-demand, targeted, laser-based wireless power transfer without use of inductive power transfer (i.e., without use of electromagnetic fields provided by inductive coupling) and/or without radio frequency wireless power transfer (i.e., without reliance on radio signals between three kilohertz to three-hundred gigahertz frequency to transfer power). As such, various embodiments of the present disclosure can provide a system that can provide an access point for data communication and also can provide laser-based wireless power transfer. Unlike traditional systems which rely on inductive wireless power transfer and/or radio frequency wireless power transfer, embodiments of the present disclosure can provide laser-based wireless power transfer that can reduce potential spectrum interferences in data transmission during power transfer, and also limit contribution to electromagnetic pollution in the particular operating environment. By this, aspects and embodiments of the present disclosure can improve the field of network communication and wireless power transfer by enabling network edge devices to serve as a node for laser-based wireless power transfer without interfering with wireless network communications, thereby allowing a network access point to be co-located with components that provide the laser-based wireless power transfer, such as further discussed below.

In various embodiments, an instance of a wirelessly chargeable equipment (e.g., any of the WCE 102, 118) can be configured as a ground-based vehicle (a car, a truck, a van, a sport utility vehicle, a cross-over vehicle, a motorcycle, a motorized tricycle, a scooter, a go-kart, a golf cart, a fork lift, a bus, a semi-trailer truck, a racing vehicle, a snow-capable vehicle, earth-moving equipment, farming/agriculture equipment, combinations thereof, or any other vehicle that is configured to receive laser-based wireless power transfer), an air-based vehicle (e.g., an unmanned aircraft vehicle, a remote-controlled vehicle, and/or any other flying vehicle that is configured to receive laser-based wireless power transfer), a user equipment (e.g., a smart phone, a tablet, a head unit within a vehicle, an Internet of Things device, and/or any other user equipment that is configured to receive laser-based wireless power transfer for energy replenishment), and/or any other device that is configured to receive laser-based wireless power transfer for energy replenishment. Although two instances of a WCE (e.g., the WCE 102, 118) are illustrated in FIG. 1, it is understood that less than two or more than two instances of a WCE can be included in the operating environment 100. It should be understood that the examples provided are for illustration purposes only, and therefore should not be construed as limiting in any way.

In some embodiments, the WCE 102 and the WCE 118 can be configured substantially similar to each other. For clarity purposes, a discussion of the WCE 102 will be provided. It is understood that any elements of the WCE 102 can be included in the WCE 118. Furthermore, in some embodiments, one or more aspects of a vehicle may be included in any of the WCE 102 and/or the WCE 118, such as discussed below with respect to FIG. 2. Therefore, it should be understood that the examples provided are for illustration purposes only, and therefore should not be construed as limiting in any way.

As shown in FIG. 1, the WCE 102 can include a head unit 103. The head unit 103 can include one or more instances of a processor, memory, circuitry, and/or a display for presenting a user interface that can provide visual images and/or audiovisual input and output. The head unit 103 also can include (and/or be communicatively coupled to) input and output components that provide audio output and receive input from a user, such as via one or more speakers and/or microphones. In some embodiments, the head unit 103 can be configured to include a heads up display, a vehicle information display, a console display, blind spot alert mechanisms, a combination thereof, or any other audio, visual, and/or haptic feedback mechanism that can communicate or convey information to a user associated with the WCE 102. In some embodiments, information and data pertaining to wireless power transfer can be provided or otherwise presented to a user via the head unit 103 through visual presentation and/or audio presentation. It should be understood that the examples provided are for illustration purposes only, and therefore should not be construed as limiting in any way.

In various embodiments, the WCE 102 can include a telematics control unit ("TCU") 104. In various embodiments, the TCU 104 can be configured substantially similar to a TCU discussed with respect to FIG. 2. The TCU 104 can include communication components and circuitry that provide and support communicative coupling with other devices and networks, such as but not limited to, the network 120, the network server 122, the RAN 132, the NED 140, the NED 160, and/or the NED 164. The TCU 104 can send, receive, and/or control communication flow to/from the head unit 103. In various embodiments, the TCU 104 can provide an embedded computing system for vehicle tracking and location information. As such, in various embodiments, the TCU 104 can include one or more of a global position system unit, an external interface for mobile communication (e.g., GSM, GPRS, Wi-Fi, WiMax, 3G, 4G, LTE, 5G New Radio ("NR"), etc.) to provide communicative coupling, a processor, a memory, and other components to enable or otherwise facilitate equipment tracking and communication. In some embodiments, the TCU 104 can indicate an amount of signal strength, available network connections, and other information pertaining to communication to/from and/or location of the WCE 102. In some embodiments, information provided by the TCU 104 can be presented to a user via the head unit 103. The TCU 104 can expose one or more network communication interfaces that provide communication links to a network access point, such as a network access point 152 provided by the NED 140, as discussed below in further detail.

In various embodiments, each instance of a WCE can correspond with a WCE identifier, such as the WCE 102 corresponding with a WCE identifier 108. An instance of the WCE identifier 108 can be unique to the particular WCE that is configured to receive laser-based wireless power transfer. As such, an instance of the WCE identifier 108 can be used by network infrastructure to determine whether the WCE 102 is authorized to access and utilize a wireless power transfer service ("WPT service") 124. Further discussion of the WPT service 124 is provided below. In some embodiments, the WCE identifier 108 may include and/or correspond with an international mobile equipment identity, a subscriber identity module number, an electronic serial number, a combination thereof, or another identifier assigned or associated with the WCE 102. It is understood that the examples provided are for illustration purposes only, and therefore should not be construed as limiting in any way.

In various embodiments, an instance of the TCU 104 can generate, store, and/or provide location information as to the current and/or former location of the corresponding WCE (e.g., the WCE 102). In some embodiments, the TCU 104 can generate one or more instance of a location identifier 109 that can indicate the location of the WCE 102 at a given point in time. For example, in some embodiments, the location identifier 109 can provide GPS-based and/or non-GPS based location information, such as geo-coordinates, street addresses, cross-street identifiers, roadway or other thoroughfare markers, waypoint markers, network access point identifiers, or any other data or information that can be used to indicate a geographic location of the WCE 102. In some embodiments, each instance of the location identifier 109 can provide a time marker that indicates the point in time at which the location of the WCE 102 was determined. In some embodiments, the TCU 104 can maintain a location log that includes an instance of the location identifier 109, where the most recent instance in time of the location identifier 109 can be used as a "current" location for the WCE 102, even if the WCE 102 has moved away or otherwise is no longer at the location corresponding to the particular location identifier 109. In some embodiments, the TCU 104 can report or otherwise provide instances of the location identifier 109 to the NED 140 so as to facilitate tracking of the movement of the WCE 102. In some embodiments, the location identifier 109 may provide data pertaining to a direction 113 and a speed that the WCE 102 is traveling to yield a velocity 114 of the WCE 102. Through various instances of the location identifier 109, the NED 140 can prepare for when the WCE 102 will be within a power transfer range for laser-based wireless power transfer, such as a power transfer range 149 corresponding to the NED 140 discussed below.

In various embodiments, an instance of the WCE 102 can include a rechargeable battery system ("battery system") 105. The battery system 105 can be configured to provide a rechargeable power source to facilitate various operations and energy consumption by a WCE (e.g., the WCE 102). The battery system 105 can include one or more instances of a rechargeable battery cell 106 that is configured to provide power storage for one WCE (e.g., the WCE 102). The rechargeable battery cell 106 can be manufactured through a variety of materials, such as nickel-metal hydride, lithium-ion, or other materials. Various instances of the rechargeable battery cell 106 are understood by one of ordinary skill in the technology, and therefore further discussion will not be provided. The battery system 105 can indicate a current charge level 107 corresponding to an amount of power remaining in the rechargeable battery cell 106. In various embodiments, the current charge level 107 can indicate the collective amount of current charge across all instances of the rechargeable battery cell 106 that are included in the battery system 105. In some embodiments, the current charge level 107 may be measured in units of milli-amp hours (mAh), although this may not necessarily be the case in all embodiments. In various embodiments, the current charge level 107 can be indicated, presented, and/or provided to a device and/or display, such as to the head unit 103, the NED 140, the network server 122, or the like. It is understood that the examples provided are for illustration purposes only, and therefore should not be construed as limiting in any way.

In some embodiments, a WCE (e.g., the WCE 102) can provide a charge criticality indicator, such as a charge criticality indicator 110. The charge criticality indicator 110 can affect the adjustment and/or configuration of an optical beamforming transmitter that supports wireless power transfer, such as an optical beamforming transmitter ("OBFT") 142 of the NED 140. A detailed discussion of the OBFT 142 will be provided below. The charge criticality indicator 110 can represent an indication as to the urgency, criticality, and/or need for power transfer to the WCE (e.g., the WCE 102). For example, in some embodiments, the charge criticality indicator 110 can be configured to indicate a "normal" criticality, a "low" criticality, and/or a "high" criticality. The "normal" criticality can indicate that the WCE 102 requests wireless power transfer according to whatever default setting and/or standard configurations of the wireless power transfer source, such as a standard configurations of the OBFT 142 of the NED 140. For example, in some embodiments, if the OBFT 142 of the NED 140 is configured in a default setting to provide laser-based wireless power transfer in a discontinuous beam (i.e., wireless power transfer occurring in laser bursts or pulses instead of a continuous laser beam), then the "normal" criticality indicated by the charge criticality indicator 110 may trigger (or otherwise command) the NED 140 to maintain the default setting of discontinuous wireless power transfer. As such, the NED 140 would not adjust the OBFT 142 to deviate from the default laser configuration. In some embodiments, the "low" criticality can indicate that wireless power transfer is not urgent, and thus the NED 140 can configure or otherwise adjust the OBFT 142 to reduce the amount of laser-based wireless power transfer to the WCE 102. For example, in some embodiments, the OBFT 142 can be adjusted to increase a time period in between pulses in which a laser beam provides the wireless power. For instance, if the default setting provides laser pulses with a 15 millisecond time period between each pulse, then the "normal" criticality would maintain the 15 millisecond time period for discontinuous wireless power transfer. If the "low" criticality is indicated by the charge criticality indicator 110, then the OBFT 142 can be adjusted so that the time interval is increased (e.g., to a 200 millisecond time period), thereby decreasing the overall amount of wireless power transfer provided.

In some embodiments, the charge criticality indicator 110 can indicate a "high" criticality, which can command the NED 140 to provide additional power transfer above the default setting. In some embodiments, the charge criticality indicator 110 can be set to the "high" criticality when the WCE 102 is performing (or going to perform or otherwise engage in) operations that are sensitive to charge interruption, such as because the operations increase power demand on the WCE 102. For example, if a user is going to be engaging in an important phone call, or any other operation that may cause the WCE 102 to utilize an above-average power draw from the battery system 105, then the WCE 102 may become sensitive to charge interruptions because the rate at which the current charge level 107 will diminish is increased relative to normal operations. As such, the WCE 102 can configure the charge criticality indicator 110 to reflect the "high" criticality. In turn, the NED 140 and/or the network server 122 can be triggered to adjust the OBFT 142 in a manner that may provide additional laser-based wireless power transfer so as to offset the increased power draw on the WCE 102. For example, in some embodiments, when the charge criticality indicator 110 represents or otherwise indicates that the WCE 102 is sensitive to charge interruptions (e.g., due to high demand for power on the WCE 102), then the NED 140 can be instructed to adjust the OBFT 142 so as to decrease, or in some embodiments eliminate, the time period between pulses or bursts of wireless power transfer, thereby increasing the overall laser-based wireless power transfer provided (i.e., increasing the overall amount of power transfer measured in mAh). As such, in some embodiments, the charge criticality indicator 110 can cause the NED 140 to configure the OBFT 142 so as to provide a continuous laser beam, and thus continuous wireless power transfer to the WCE 102 instead of the default configuration, where the default may provide discontinuous wireless power transfer. The example discussed herein refers to the charge criticality indicator 110 as providing three settings (e.g., low, normal, high), however this may not necessarily be the case in every embodiment. In some embodiments, the charge criticality indicator 110 may be configured as a flag such that, when provided to the NED 140, the presence of the charge criticality indicator 110 can cause the OBFT 142 to be reconfigured so as to provide additional power transfer, such as discussed with respect to the "high" criticality setting above. Therefore, the examples provided are for illustration purposes only, and should not be construed as limiting in any way.

In various embodiments, a WCE (e.g., the WCE 102) can include a laser photodetector that is configured to receive laser-based wireless power transfer, such as from a laser beam 143 provided by the OBFT 142. In some embodiments, an instance of a laser photodetector can include one or more of an adjustable laser photodetector 111 and/or a fixed photodetector 112. An instance of the adjustable laser photodetector 111 can include a rotatable base 111A, a physical adjustment unit 111B, and a photovoltaic solar panel cell ("PSPC") 111C. The rotatable base 111A can mount or otherwise be attached to an exterior portion of a WCE (e.g., the WCE 102). The rotatable base 111A can provide a mounting surface on which to mount the PSPC 111C. The rotatable base 111A can be configured to rotate the PSPC 111C in a clock-wise and/or counter clock-wise rotation, where the angle of rotation may be up to 360 degrees. In some embodiments, the adjustable laser photodetector 111 does not rotate 360 degrees continuously while in use. Instead, the adjustable laser photodetector 111 can be configured or otherwise instructed to maintain line-of-sight with an instance of the OBFT 142, which can increase energy transfer by placing more surface area of the PSPC 111C within the coverage of the laser beam 143 for power transfer. The physical adjustment unit 111B can include a motor, hydraulics, pistons, gears, belts, circuitry, and/or other components that can adjust or otherwise change a physical direction, rotation angle (e.g., between 0-360 degrees clockwise and/or counter clockwise), and/or vertical angle (e.g., tilt angle measured 0-90 degrees) of the rotatable base 111A and/or the PSPC 111C. As such, the physical adjustment unit 111B can adjust the tilt of the PSPC 111C relative to the rotatable base 111A and/or can adjust the rotatable base 111A between 0-360 degrees clockwise and/or counter clockwise as needed and/or instructed. For example, the PSPC 111C may, by default, be pointed in the same direction as the direction 113 the WCE 102 is traveling, and thus the default rotation angle would be considered to be zero degrees.

In this example, the PSPC 111C may have a vertical angle (e.g., tilt angle) that is zero degrees because the PSPC 111C may be substantially parallel to the rotatable base 111A and/or another mounting surface of the WCE 102. As such, in a default setting, the PSPC 111C may lay flat relative to the WCE 102. In this example, the WCE 102 may receive an adjustment instruction from an NED, such as adjustment instruction 174 that may be sent from the NED 140. The adjustment instruction 174 can provide geographical location information of the corresponding NED that will be providing the laser-based wireless power transfer, such as a NED location identifier 129A that can indicate location information about the NED 140 which is and/or will be providing laser-based wireless power transfer to the WCE 102. The adjustment instruction 174 can command the physical adjustment unit 111B to configure the adjustable laser photodetector 111 so as to maintain line of sight between the WCE 102 and the NED (e.g., the NED 140) that is or will provide the wireless power transfer. For example, the physical adjustment unit 111B can be instructed by the adjustment instruction 174 to adjust the rotatable base 111A such that the PSPC 111C is constantly pointed towards the NED 140. Therefore, when the WCE 102 is stationary, the physical adjustment unit 111B may make a single adjustment of the rotational angle of the rotatable base 111A so that the PSPC 111C is pointed towards the NED 140.

Yet in some embodiments, the WCE 102 may be moving through a power transfer range of a corresponding NED, such as one of power transfer ranges 149, 161, 165 corresponding to the NEDs 140, 160, and 164, respectively. A power transfer range (e.g., any of the power transfer ranges 149, 161, 165) refers to the geographical coverage area in which laser-based wireless power transfer can be provided by a corresponding NED (e.g., the NEDs 140, 160, and/or 164). Therefore, in some embodiments, as the WCE 102 moves through a power transfer range (e.g., the power transfer range 149), the adjustable laser photodetector 111 can maintain line of sight between the PSPC 111C and the OBFT 142 of the NED 140. Specifically, the physical adjustment unit 111B can provide multiple adjustments to the rotational angle of the rotatable base 111A so that the PSPC 111C is continuously pointed towards the OBFT 142, thereby maintaining line of sight for wireless power transfer. In some embodiments, the vertical angle of the PSPC 111C may also be adjusted so that the PSPC 111C is tilted vertically (e.g., between 1-90 degrees), thereby enabling a larger contact area for absorption of the laser beam 143. In some embodiments, the physical adjustment unit 111B may continually (and/or intermittently) adjust the vertical angle of the PSPC 111C based on how far away the WCE 102 is from the corresponding NED (e.g., the NED 140) and based on the direction 113 that the WCE 102 is moving relative to the NED 140.

In various embodiments, an instance of the PSPC 111C can include photovoltaic materials that are configured in one or more layers. The photovoltaic materials can be configured to provide a semiconductor, where each layer is doped to absorb photons from the laser beam 143 a particular wavelength spectrum, and in turn can create an electric current that can be used to power the WCE 102. In various embodiments, a photovoltaic material of the PSPC 111C can include, but should not be limited to, indium, gallium, nitrogen, graphene, silicone, combinations thereof, or the like. In some embodiments, the laser beam 143 can be configured to provide and correspond with one or more wavelengths for ultraviolet light (e.g., 10-380 nanometer wavelength), visible light (e.g., violet light from 380-450 nanometers, blue light from 450-495 nanometers, green light from 495-570 nanometers, yellow light from 570-590 nanometers, orange light from 590-620 nanometers, and red light from 620-750 nanometers), or infrared light (e.g., 750-1,000,000 nanometer wavelength). In various embodiments, the PSPC 111C can be configured so as to absorb photons from the laser beam 143.

In various embodiments, an instance of a WCE (e.g., the WCE 102) can include the fixed photodetector 112. The fixed photodetector 112 can include an instance of the PSPC 111C that is rigidly fixed or otherwise attached to the WCE 102. As such, the fixed photodetector 112 may be in a fixed configuration relative to the WCE 102. In various embodiments, the fixed photodetector 112 can receive or otherwise obtain laser-based wireless power transfer from a NED (e.g., the NED 140). In some embodiments, the WCE 102 may have one or more instances of the fixed photodetector 112 that are placed at different portions of the WCE 102. For example, in an embodiment where the WCE 102 is configured as an electric vehicle, instances of the fixed photodetector 112 may be located on a roof, hood, trunk, headlight casing, door frames, or any other part of the WCE 102. It is understood that the examples provided are for illustration purposes only, and therefore should not be construed as limiting in any way.

In various embodiments, an instance of a WCE (e.g., the WCE 102) can provide or otherwise send a power charge message, such as a power charge message 170, to one or more of a NED (e.g., the NED 140), the RAN 132, the network 120, and/or the network server 122. The power charge message 170 can request wireless power transfer to charge the battery system 105 of the WCE 102. In some embodiments, the power charge message 170 can include an instance of the WCE identifier 108 and one or more instances of the location identifier 109. In some embodiments, the power charge message 170 can be generated by an instance of a WCE (e.g., the WCE 102) and sent to the NED 140 and/or the network server 122 when wireless power transfer is requested. In some embodiments, the network server 122 and/or an instance of NED (e.g., one of the NED 140, 160, 164) may detect the presence and/or location of a WCE (e.g., the WCE 102), and in turn may generate the power charge message 170 on behalf of the WCE 102. In some embodiments, one instance of the power charge message 170 may be provided to the network server 122 so that wireless power transfer can be provided by one or more NEDs (e.g., any of the NEDs 140, 160, 164) that are ahead of the WCE 102. The power charge message 170 may be sent from the WCE 102 prior to the WCE 102 being within the power transfer range 149, 161 and/or 165 of one or more of the NEDs 140, 160, and/or 164. Therefore, in some embodiments, the power charge message 170 may be used by the network server 122 to determine which of the NEDs 140, 160, and/or 164 is closest and/or should be used to provide wireless power transfer. It is understood that the examples provided are for illustration purposes only, and therefore should not be construed as limiting in any way.

In various embodiments, the operating environment 100 can include the network 120 that can include, support, or otherwise communicate with a radio access network, such as the RAN 132. In some embodiments, at least a portion of the network 120 and/or the RAN 132 can be associated with a communications service provider. In various embodiments, the network 120 can include an evolved packet core network, a core network, an IP-based network, a transport network, an optical transport network, a circuit switched network, a mobile Wide Area Network, a combination thereof, or the like. It is understood that the network 120 can communicate with one or more computing systems and/or devices that are external to the network 120 (e.g., any of the WCEs 102, 118) via one or more network access points that can establish, provide, and maintain wireless and/or wired communication links. In some embodiments, an instance of a network access point, such as the network access point 152, can be provided or otherwise included within an instance of a network edge device, such as any of the NEDs 140, 160, and/or 164. It is understood that, in some embodiments, one or more instances of a network access point may provide wired and/or wireless communicative coupling to any component of the operating environment 100. In various embodiments, the network 120 may be accessed via one or more instance of the RAN 132. In some embodiments, the RAN 132 and/or the network 120 can include one or more instances of a NED, such as any of the NEDs 140, 160, and/or 164, that has an instance of the network access point 152 included therein. In various embodiments, an instance of the network access point 152 can include, but should not be limited to, one or more of a base transceiver station, a wireless router, a femtocell, an Node B, an eNodeB, a gNodeB (i.e., an access point that incorporates New Radio access technology, such as LTE Advanced, and other 5G technology), a multi-standard metro cell node, an optical network terminal, and/or other network nodes or combinations thereof that are capable of providing communication to and/or from the network 120. In some embodiments, the network 120 and/or an instance of the RAN 132 can include and support one or more of an evolved universal mobile telecommunications system ("UMTS"), a terrestrial radio access ("E-UTRAN"), a mobility management entity ("MME"), a serving/PDN gateway ("S/PGW"), a home subscriber server ("HSS"), an access and mobility function ("AMF"), a session management function—user plane function ("SMF-UPF"), unified data management ("UDM"), a vehicle-to-everything ("V2X") application server, an application function ("AF"), an enhanced mobile broadband system ("eMBBS"), a mobile edge computing ("MEC") unit, a combination thereof, and/or any other systems, devices, and/or functions that may be included in 2G, 3G, 4G, 5G, or later communication architecture. It should be understood that the examples provided are for illustration purposes only, and therefore should not be construed as limiting in any way.

In various embodiments, the operating environment 100 can include at least a portion of the power grid 130. The power grid 130 refers to one or more energy harvesting and/or power source components that enable power generation and/or wired power transmission from a power source (e.g., a power plant). It is understood that the power grid 130 may harness energy from a variety of sources (e.g., solar, fossil fuels, wind, hydro-electric, etc.) as understood by one of ordinary skill in the technology. In some embodiments, the power grid 130 can include or otherwise provide one or more power transmission cables that support wired power transmission to any instance of a NED, such as any of the NEDs 140, 160, 164. As such, each of the NEDs 140, 160, 164 can serve as an edge device for wireless power transmission. In some embodiments, the power grid 130 can provide information to and/or from the network 120 as to the amount of power that is being handled or otherwise transmitted by each NED (e.g., any of the NEDs 140, 160, 164). By this, a communication service provider can provide a wireless power transmission service, such as the WPT service 124 to WCEs (e.g., the WCEs 102, 118) that are already clients of the network 120 and/or the RAN 132. It should be understood that the examples provided are for illustration purposes only, and therefore should not be construed as limiting in any way.

In various embodiments, the operating environment 100 can include one or more instance of the network server 122 that can support, host, execute, or otherwise facilitate operation of the WPT service 124. In various embodiments, the WPT service 124 may be configured as a software platform that is hosted by one or more computing systems to manage laser-based wireless power transfer to one or more WCEs (e.g., the WCEs 102, 118). It is understood that the use of the term "service" is intended to correspond with one or more network operations that support handling of communications, messages, and/or instructions for wireless power transmission over the network 120 and/or the RAN 132. Therefore, any use of the term "service" in the claims shall not be construed or interpreted as being direct to, involving, or otherwise including a judicial exception (e.g., an abstract idea, an idea of itself, an economic process, etc.) or any other non-patentable subject matter. As such, the use of the term "service" shall be construed within the realm of technology as understood by one of ordinary skill in technology. It should be understood that the examples provided are for illustration purposes only, and therefore should not be construed as limiting in any way.

In various embodiments, the network server 122 can include one or more instance of a processing unit and/or processing circuitry, such as one or more instance of a processor 121A. In various embodiments, an instance of the processor 121A can be configured at least similar and/or identical to an instance of a processing unit discussed below with respect to FIG. 6. In various embodiments, the network server 122 can include one or more instance of a data storage device, such as a memory 121B. In some embodiments, the memory 121B can include volatile and/or non-volatile memory implemented in any method or technology for storage of information such as computer-executable instructions, data structures, software program modules, or other data disclosed herein. It is understood that, use of the term "memory" and "computer storage medium" and variations thereof in the claims does not include, and shall not be construed to include, a wave or a signal per se and/or communication media. The memory 121B can be configured substantially similar to memory discussed further below with respect to FIG. 6. It should be understood that the examples provided are for illustration purposes only, and therefore should not be construed as limiting in any way.

In various embodiments, the WPT service 124 of the network server 122 can receive and/or detect the power charge message 170 from the WCE 102. In some embodiments, the WPT service 124 can analyze the contents of the power charge message 170, such as but not limited to, an instance of the WCE identifier 108 and/or the location identifier 109. In various embodiments, an instance of the WCE identifier 108 can be used to compare against a power authorization map 126 to facilitate determination of whether the corresponding WCE (e.g., the WCE 102) is authorized to receive wireless power transfer from one or more of the NEDs 140, 160, 164. In various embodiments, the power authorization map 126 can include a plurality of authorized identifiers, such as authorized identifiers 127A-N, that provide an identity of equipment which are authorized and approved to use the WPT service 124, and thus receive laser-based wireless power transfer from one or more of the NEDs 140, 160, and/or 164. For example, in an embodiment where the WCE 102 is a client of the WPT service 124, then the WCE identifier 108 corresponding to the WCE 102 will be found to correspond with one of the authorized identifiers 127A-N of the power authorization map 126. In various embodiments, each instance of an authorized identifier from among the plurality of authorized identifiers 127A-N can correspond with a particular equipment profile, such as one of equipment profiles 128A-N. Therefore, the power authorization map 126 can provide a pointer from one of the authorized identifiers 127A-N to a corresponding one of the equipment profiles 128A-N. In various embodiments, an instance of an equipment profile (e.g., any of the equipment profiles 128A-N) can indicate information about the associated WCE (e.g., the WCE 102), which can include, but should not be limited to, whether the associated WCE has an instance of the adjustable laser photodetector 111, the equipment type of the associated WCE (e.g., an electric road vehicle, an air-based vehicle, a user equipment such as a smart phone, etc.), historical power transfer data (i.e., a historical power transfer log indicating when, where, and/or how much power was transferred to the associated WCE using the WPT service 124), and/or historical location data (i.e., historical location log of where the associated WCE has traveled or otherwise moved so as to facilitate determination of trends and/or predictions for movement).

In some embodiments, the power authorization map 126 can indicate whether a particular WCE (e.g., any of the WCEs 102, 118) corresponds with an equipment priority flag, such as an equipment priority flag 125. An instance of the equipment priority flag 125 can indicate that a corresponding WCE should be prioritized to receive wireless power transfer before other WCEs, and thus communications associated with that corresponding WCE should be handled with a higher priority than a WCE without the equipment priority flag 125. For example, in some embodiments, an instance of a WCE may be configured as equipment used for emergency operations (e.g., an ambulance, a police car, a fire truck, a rescue vehicle, device used my emergency rescue personnel, etc.), and therefore the WPT service 124 may assigned or otherwise associated with an instance of the equipment priority flag 125 with one of the equipment profiles 128A-N that is associated with the WCE configured for emergencies. Therefore, in various embodiments, one or more of the equipment profiles 128A-N of the power authorization map 126 can include and/or point to an instance of the equipment priority flag 125 when the associated WCE should receive high priority handling, and thus should be provided wireless power transfer before other WCEs that do not have an instance of the equipment priority flag 125.

In some embodiments, an instance of a WCE (e.g., the WCE 102) can provide the WPT service 124 with a current charge profile, such as a current charge profile 172. For example, as illustrated in FIG. 1, the WCE 102 may provide any of the NED 140, the RAN 132, the network 120, and/or the network server 122 with an instance of the current charge profile 172. The current charge profile 172 can include an instance of the charge criticality indicator 110 and the current charge level 107. In some embodiments, the current charge level 107 may be measured in terms of a percentage (e.g., from 0-100%, where 0% corresponds with a fully depleted charge and 100% corresponds with a full charge) so as to indicate the relative charge level of the associated WCE at the time that the current charge profile 172 and/or the current charge level 107 was sent to the network server 122. In some embodiments, the WPT service 124 may configure or otherwise provide a charge threshold 123. The charge threshold 123 can indicate a threshold which must be crossed before a particular WCE is allowed to engage or otherwise participate in wireless power transfer. For example, in some embodiments, the charge threshold 123 can be a value between 0-100, and thus may be compared against an instance of the current charge level 107. In some embodiments, the current charge level 107 must be below the charge threshold 123 in order for the WCE to be allowed to receive wireless power transfer. For example, if the current charge level 107 indicates that the WCE 102 has a current charge of 50%, but the charge threshold 123 is set to 20%, then the current charge level 107 is above the charge threshold 123, and therefore the WCE 102 does not qualify to receive wireless power transfer at the current instance in time. The WPT service 124 may ping or otherwise obtain updated information about an instance of the current charge level 107 of the WCE 102. Therefore, once the current charge level 107 crosses the charge threshold 123 (i.e., falls below the charge threshold 123), then the corresponding WCE (e.g., the WCE 102) can be permitted to receive wireless power transfer.

In various embodiments, the network server 122 can store NED location identifiers, such as the NED location identifiers 129A-N, that include information and/or identifiers pertaining to the location of various NEDs (e.g., any of the NEDs 140, 160, 164) that support the WPT service 124. For example, each of the NEDs 140, 160, 164 can operate in a particular geographic location, and thus each of the NEDs 140, 160, 164 can correspond with one of the NED location identifiers 129A-N. For example, in some embodiments, the NED 140 can correspond with the NED location identifier 129A, which is included as one of the NED location identifiers 129A-N. In some embodiments, the WPT service 124 can use one or more instances of the location identifier 109 provided by a WCE (e.g., the WCE 102) and/or historic location information included in a corresponding instance of one of the equipment profiles 128A-N to compare against the NED location identifiers 129A-N, and in turn determine which of the NEDs 140, 160, 164 should and/or could be used to implement wireless power transfer. For example, if the location identifier 109 of the WCE 102 currently indicates that the location of the WCE 102 is closest to the NED location identifier 129A of the NED 140, then the WPT service 124 may assign the NED 140 to the WCE 102, and instruct at least the NED 140 to perform one or more operations discussed herein to support wireless power transfer to the WCE 102.

In various embodiments, the operating environment can include one or more NEDs that support and facilitate wireless power transfer, such as any of the NEDs 140, 160, and/or 164. In various embodiments, each of the NEDs 140, 160, 164 may be configured substantially similar to each other. For clarity purposes, a discussion of the NED 140 is provided, however it is understood that any of the components of the NED 140 may be included in other NEDs, such as the NEDs 160, 164. The NED 140 can include one or more of a wireless power transfer assembly ("WPT assembly") 141, the network access point 152, a wireless power transfer controller ("WPTC") 150, a processor 154, and a memory 156. The processor 154 can be configured substantially similar to a processing unit discussed with respect to FIG. 6. The memory 156 can be configured substantially similar to memory discussed with respect to FIG. 6. The WPTC 150 can be configured as software, a script, a module, and/or other computer executable instructions that can operate in coordination with the WPT service 124 to facilitate wireless power transfer to a WCE, such as the WCE 102. In various embodiments, the WPTC 150 can be executed by the processor 154 so as to enable performance of one or more operations discussed herein. In various embodiments, the NED 140 can include one or more instances of the network access point 152 that can be configured as one or more of a base station, a NodeB, an evolved Node B ("eNB"), a next generation Node B ("gNB") that support 5G New Radio standards, a combination thereof, or another network communication component that supports wireless communicative coupling with one or more WCEs, such as the WCEs 102, 118. It should be understood that the examples provided are for illustration purposes only, and therefore should not be construed as limiting in any way.

In various embodiments, an instance of the WPT assembly 141 can include components that enable laser-based wireless power transfer. For example, in some embodiments, the WPT assembly 141 can include one or more instance of an optical beamforming transmitter, such as the OBFT 142, a rotational support structure 144, power adjustment components 146, and equipment detection components 148. The OBFT 142 can include a laser emitter (i.e., a laser transmitter that can generate the laser beam 143), a beam expander, and a spatial light modulator that, in some embodiments, can be configurable to facilitate optical beamforming of the laser beam 143, such as based on one or more instructions from the WPTC 150, the WPT service 124, and/or elements of the WPT assembly 141. The OBFT 142 can be implemented to generate or otherwise provide an instance of the laser beam 143 to facilitate and support laser-based wireless power transfer. In some embodiments, the OBFT 142 may be configured so as to provide discontinuous wireless power transfer, such as by providing the laser beam 143 in pulses (i.e., bursts of photons). In some embodiments, the OBFT 142 (e.g., via a laser transmitter therein) can provide bursts that are pulsed in time intervals measured in milliseconds and/or nanoseconds. In various embodiments, an instance of the OBFT 142 can provide a laser diode that directly converts electrical energy into photons that are focused so as to produce an instance of the laser beam 143. In some embodiments, the OBFT 142 can be configured to generate a laser beam at specific wavelengths, such as via laser diode that provides a green laser beam (i.e., within the visible spectrum for green light between 495-570 nanometers). It is understood that the OBFT 142 can be configured so as to generate an instance of the laser beam 143 at other wavelengths within the ultraviolet spectrum, the visible spectrum, and/or the infrared spectrum. In some embodiments, the OBFT 142 may be configured to mimic at least a portion of solar radiation (e.g., between 380-750 nanometer wavelength). Unlike microwave wireless power transfer mechanisms, the WPT assembly 141 can be configured so that the OBFT 142 can provide laser-based wireless power transfer so that the power transfer range (e.g., the power transfer ranges 149, 161, 165) can span from tens of meters to hundreds of meters. It should be understood that the examples provided are for illustration purposes only, and therefore should not be construed as limiting in any way.

In some embodiments, the WPT assembly 141 can include the rotational support structure 144. The rotational support structure 144 can be configured to enable the OBFT 142 to rotate, which in turn can allow the OBFT 142 to track the movement of a WCE (e.g., the WCE 102). In some embodiments, the rotational support structure 144 can include vertical adjustment components that enable the OBFT 142 to adjust a vertical angle (i.e., tilt angle), thereby allowing the OBFT 142 to tilt up and down so as to maintain a line of sight with the particular WCE (e.g., the WCE 102). In some embodiments, the WPT assembly 141 can include power adjustment components 146. The power adjustment components 146 can include motors, pistons, gears, belts, transceivers, circuitry, power supplies, power converters, combinations thereof, and other components that can receive instructions from one or more of the WPTC 150 and/or the WPT service 124 to enable the OBFT 142 to activate the OBFT 142 and/or enable movement of the rotational support structure 144.

In some embodiments, the WPT assembly 141 can include equipment detection components, such as the equipment detection components 148. The equipment detection components 148 can include one or more of a radar, ultrasonic sensor, video camera (e.g., visible and/or infrared optical video camera), and/or laser detector. The equipment detection components 148 can be implemented so as to enable the WPT assembly 141 to identify, determine, or otherwise detect when a WCE (e.g., the WCE 102) is within the corresponding power transfer range (e.g., the power transfer range 149) and/or where the WCE (e.g., the WCE 102) is located relative to the OBFT 142. In various embodiments, the equipment detection components 148 may provide visual images and/or a video stream to the WPTC 150 and provide object recognition. By this, the WPT assembly 141 can distinguish the WCE 102 from the WCE 118, and target the appropriate WCE based on object recognition. For example, if the WCE 102 requested wireless power transfer, but both the WCE 102 and the WCE 118 are within the power transfer range 149, then the equipment detection components 148 can be activated to confirm that the WCE 102 is within the power transfer range 149, while also distinguishing the WCE 102 from the WCE 118, thereby enabling the OBFT 142 to track the WCE 102 and maintain line of sight for wireless power transmission. In various embodiments, the equipment detection components 148 can enable the WPT assembly 141 to determine that a particular WCE (e.g., the WCE 102) is not stationary because the equipment detection components 148 can detect that the WCE 102 is moving within the power transfer range 149. In some embodiments, the WPTC 150 can determine that a WCE (e.g., the WCE 102) is not stationary within and/or outside of the power transfer range (e.g., the power transfer range 149) based on changes in instances of the location identifier 109 that are provided by the WCE (e.g., the WCE 102). In some embodiments, the equipment detection components 148 can be implemented to confirm a direct line of sight between the OBFT 142 and the corresponding WCE that is the target of wireless power transmission (e.g., the WCE 102). For example, the equipment detection components 148 may confirm that the adjustable laser photodetector 111 and/or the fixed photodetector 112 is not obstructed from view, and thus the OBFT 142 has a clear line of sight so that the laser beam 143 can be targeted directly to the particular WCE (e.g., the WCE 102).

In various embodiments, the WPT assembly 141 can activate the OBFT 142 so as to provide wireless power transfer to a particular WCE (e.g., the WCE 102). When the OBFT 142 is activated, an instance of the laser beam 143 can be emitted and targeted to the particular WCE (e.g., the WCE 102). In some embodiments, the OBFT 142 can pulse the activation of the OBFT 142 so that the laser beam 143 is provided in bursts. In some embodiments, the power adjustment components 146 of the WPT assembly 141 can adjust the time interval of pulses of the OBFT 142 so that the time between bursts is increased or decreased. Therefore, in instances where additional power is being requested or otherwise should be provided to a WCE (e.g., if a WCE corresponds with an equipment priority flag 125 and/or provides a charge criticality indicator 110 requesting additional power transfer), the OBFT 142 can be adjusted so that the time interval between pulses is decreased, thereby increasing the overall wireless power transfer to the particular WCE (e.g., the WCE 102). By this, the PBFT can dynamically adapt and be reconfigured to provide a specific amount of wirelessly transmitted power to a particular target WCE based on the particular charge criticality indicator 110, while other WCE's may receive different amounts of wireless power transfer. As such, in some embodiments, the OBFT 142 can be activated to provide wireless power transfer after the OBFT 142 is reconfigured and/or oriented based on the charge criticality indicator 110 and the location of the target WCE, such as provided by an instance of location identifier 109. It is understood that the examples discussed are for illustration purposes only and should not be limiting in any way.

In various embodiments, the WPTC 150 and/or the WPT service 124 can determine the direction 113 of the target WCE (e.g., the WCE 102) and, in turn, determine which one or more NEDs 140, 160, 164 should be used to handle wireless power transfer. In some embodiments, the WPTC 150 and/or the WPT service 124 can assign the NED 140 to be the first to provide wireless power transfer to the WCE 102. Because the direction 113 of the WCE 102 is towards the NEDs 160, 164 after the WCE 102 leaves the power transfer range 149 of the NED 140, the WPT service 124 and/or the WPTC 150 can instruct one or more of the NEDs 160, 164 to prepare to provide wireless power delivery to the WCE 102 after the WCE 102 leaves the power transfer range 149 of the NED 140, and/or upon the WCE 102 entering the power transfer ranges 161, 165 of the NEDs 160, 164, respectively. In some embodiments, the NEDs 160, 164 may be considered "downstream" of the NED 140 because the NEDs 160, 164 would be put into service after the NED 140 is activated. In various embodiments the NEDs 160, 164 can include components that are at least similar and/or the same as the NED 140. Therefore, in various embodiments, one or more instances of the WPT assembly 141, the network access point 152, the WPTC 150, the processor 154, and/or the memory 156 can be included in the NEDs 160, 164. Because one or more of the NEDs 160, 164 may be considered downstream or downrange of the NED 140, the corresponding components within the NEDs 160, 164 may also be referred to as downstream and/or downrange. For example, in an embodiment, the NED 160 can include a downstream WPT assembly 162. The downstream WPT assembly 162 can be substantially the same and/or identical to the WPT assembly 141, and therefore the NED 160 can provide wireless power transfer to the WCE 102 in a manner that is substantially similar and/or identical to the operations discussed above with respect to the NED 140.

In various embodiments, the particular NED that is currently providing wireless power transmission may prepare other, downstream NEDs (e.g., the NEDs 160, 164) for wireless power transfer to the WCE (e.g., the WCE 102) before the target WCE (e.g., the WCE 102) leaves the current power transfer range (e.g., the power transfer range 149 of the NED 140). For example, in some embodiments, the NED 140 can generate a charge preparation command, such as any of charge preparation commands 180, 182. An instance of a charge preparation command (e.g., any of the charge preparation commands 180, 182) can be directed to another NED that is located outside of the current power transfer range, such as the NEDs 160, 164, respectively, that are located outside of the power transfer range 149 of the NED 140. In some embodiments, the charge preparation command (e.g., any of the charge preparation commands 180, 182) can be directed to, or otherwise instruct, a wireless power transfer assembly that is located within a downstream NED, such as the downstream WPT assembly 162 that can be located within the NED 160. The downstream WPT assembly 162 includes another instance of the OBFT 142 to provide wireless power transfer within the corresponding power transfer range (i.e., the power transfer range 161), which may lie inside and/or outside of the power transfer range 149 of the NED 140 which currently serves the WCE 102. In some embodiments, a charge preparation command (e.g., any of the charge preparation commands 180, 182) can instruct a corresponding NED (e.g., the NEDs 160, 164) to prepare to provide wireless power transfer to the WCE 102 by including the current location information of the WCE 102 (e.g., one or more instance of the location identifier 109 of the WCE 102) and/or other configuration information about the OBFT 142 that is currently providing wireless power transmission, such as the time period of the pulse for the laser beam 143, so that the amount of energy being provided by each of the NEDs 140, 160, 164 can be similar or otherwise match each other. In some embodiments, two or more of the NEDs 140, 160, 164 may concurrently provide wireless power transfer to a single WCE (e.g., the WCE 102) while the WCE 102 is within each of the power transfer ranges at the same time (e.g., the overlapping portions of the power transfer ranges 149 and 161, or the overlapping portions of the power transfer ranges 161 and 165).

In an embodiment, an instance of a WCE (e.g., the WCE 118) may include an instance of a WPT assembly (e.g., the WPT assembly 141). In embodiments where the WCE includes an instance of the WPT assembly 141, the corresponding WCE may be physically coupled to an interface of the power grid 130, and therefore may independently provide wireless power transfer to other WCEs, such as the WCE 102. It should be understood that the examples provided are for illustration purposes only, and therefore should not be construed as limiting in any way.

FIG. 1 illustrates the operating environment 100 having one or more instance of the WCE 102, the head unit 103, the TCU 104, the battery system 105, the rechargeable battery cell 106, the current charge level 107, the WCE identifier 108, the location identifier 109, the charge criticality indicator 110, the adjustable laser photodetector 111, the rotatable base 111A, the physical adjustment unit 111B, the PSPC 111C, the fixed photodetector 112, the direction 113, the velocity 114, the network 120, the network server 122, the processor 121A, the memory 121B, the charge threshold 123, the WPT service 124, the equipment priority flag 125, the power authorization map 126, the authorized identifiers 127A-N, the equipment profiles 128A-N, the NED location identifiers 129A-N, the power grid 130, the RAN 132, the NED 140, the WPT assembly 141, the OBFT 142, the laser beam 143, the rotational support structure 144, the power adjustment components 146, the equipment detection components 148, the power transfer range 149, the WPTC 150, the network access point 152, the processor 154, the memory 156, the NED 160, the power transfer range 161, the downstream WPT assembly 162, the NED 164, the power transfer range 165, the power charge message 170, the current charge profile 172, the adjustment instruction 174, the charge preparation command 180, and the charge preparation command 182. It should be understood, however, that some implementations of the operating environment 100 can include zero, one, or more than one instances of the above listed elements of the operating environment 100 shown in FIG. 1. As such, the illustrated embodiment of the operating environment 100 is understood to be illustrative and should not be construed as being limiting in any way.

Figure 2:
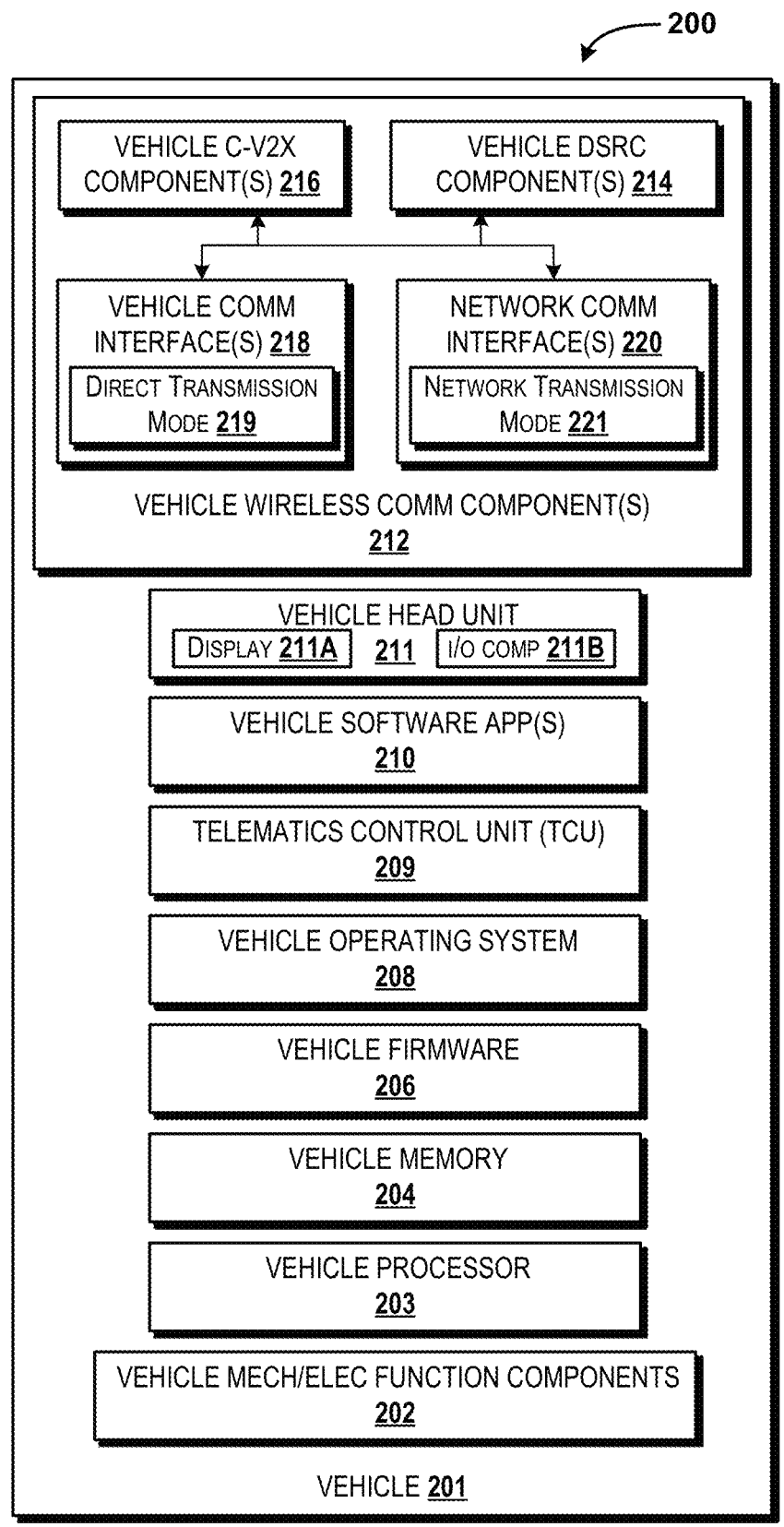
FIG. 2 is a block diagram illustrating aspects of a vehicle capable of implementing aspects of the embodiments disclosed herein.

Turning now to FIG. 2 with continued reference to FIG. 1, a block diagram 200 illustrating an instance of a vehicle 201 and aspects thereof will be described, according to an illustrative embodiment. It is understood that one or more instances of the WCE 102 and/or the WCE 118 illustrated and discussed with respect to FIG. 1 can be configured at least similar to the vehicle 201 shown and discussed with respect to FIG. 2. As such, in some embodiments, aspects of the vehicle 201 can be included in one or more instance of a wirelessly chargeable equipment (e.g., the WCE 102 and/or the WCE 118). The vehicle 201 shown in FIG. 2 is illustrated for purposes of clarity of discussion, and therefore is provided as an example. It is understood that zero, one, or more than one instances of the components discussed herein with respect to the vehicle 201 may be implemented in various embodiments. As such, the examples provided are for illustration purposes only, and therefore should not be construed as limiting in any way.

The illustrated vehicle 201 includes vehicle mechanical/electrical function components 202, a vehicle processor 203, a vehicle memory 204, a vehicle firmware 206, a vehicle operating system 208, a telematics control unit 209, one or more vehicle software application(s) 210, a vehicle head unit 211, a display 211A, an input/output component 211B, a vehicle wireless communications component 212, an instance of a vehicle communication interface 218 that supports a direct transmission mode 219, an instance of a network communication interface 220 that supports the network transmission mode 221, a vehicle dedicated short-range communications ("DSRC") component 214, and a cellular vehicle-to-anything ("C-V2X") component 216. Each of these components will now be described in detail. It is understood that the term vehicle-to-anything ("V2X") refers to a vehicle's communication ability (e.g., the vehicle 201) through components (e.g., a telematics control unit) that are configured to communicate with one or more network or network infrastructure, such as the network 120, the network server 122, and/or one or more of the NEDs 140, 160, 164. In some embodiments, a communication that is sent to and/or from a vehicle may be referred to as the implementation of vehicle-to-everything ("V2X") communications, which can include one or more of vehicle-to-vehicle ("V2V") communications, vehicle-to-infrastructure ("V2I") communications, vehicle-to-network ("V2N") communications, and/or vehicle-to-pedestrian ("V2P") communications, and may facilitate communicative coupling between vehicles, infrastructure, a network, and/or pedestrians, respectively. It is understood that the examples provided are for illustration purposes only, and therefore should not be construed as limiting in any way.

The vehicle mechanical/electrical function components 202 can include mechanisms, circuitry, elements, and/or components of the vehicle 201 that enable the vehicle to function and operate. For example, one or more instances of the vehicle mechanical/electrical function components 202 can include, an engine, a transmission, a braking system, a transmission control unit, an engine control unit, a battery system (e.g., an instance of the battery system 105), an electrical system, a safety system, a heating ventilation and air conditioning system, a lighting system, a sensor system (e.g., a lane detection system, crash avoidance system, etc.), or any other component or element that may facilitate function of the vehicle 201 and/or support one or more of the operations discussed herein. In various embodiments, the vehicle mechanical/electrical function components 202 can include one or more components of the adjustable laser photodetector 111, the fixed photodetector 112, the WPT assembly 141, a combination thereof, or the like.

The vehicle processor 203 can include one or more hardware components that perform computations to process data, and/or to execute computer-executable instructions of one or more application programs such as the vehicle software application(s) 210, one or more operating systems such as the vehicle operating system 208, other software, and/or the vehicle firmware 206. In various embodiments, an instance of the vehicle processor 203 can be included in an instance of wirelessly chargeable equipment, such as the WCE 102. The vehicle processor 203 can include one or more central processing units ("CPUs") and/or engine control units ("ECU") configured with one or more processing cores. The vehicle processor 203 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the vehicle processor 203 can include one or more discrete GPUs. In some other embodiments, the vehicle processor 203 can include CPU, ECU, and/or GPU components that are configured in accordance with a co-processing CPU/GPU computing model, wherein the sequential part of an application executes on the CPU and the computationally-intensive part is accelerated by the GPU. The vehicle processor 203 can include one or more system-on-chip ("SoC") components along with one or more other components illustrated as being part of the vehicle 201, including, for example, the vehicle memory 204, the vehicle wireless communications component 212, the DSRC component 214, or some combination thereof. In some embodiments, the vehicle processor 203 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The vehicle processor 203 can be or can include one or more hardware components architected in accordance with an ARM architecture, available for license from ARM HOLDINGS of Cambridge, United Kingdom. Alternatively, the vehicle processor 203 can be or can include one or more hardware components architected in accordance with an x86 architecture, such an architecture available from INTEL CORPORATION of Mountain View, Calif., and others. Those skilled in the technology will appreciate the implementation of the vehicle processor 203 can utilize various computation architectures, and as such, the vehicle processor 203 should not be construed as being limited to any particular computation architecture or combination of computation architectures, including those explicitly disclosed herein.

The vehicle memory 204 can include one or more hardware components that perform storage operations, including temporary or permanent storage operations. In some embodiments, the vehicle memory 204 include volatile and/or non-volatile memory implemented in any method or technology for storage of information such as computer-readable instructions, data structures, program modules, the vehicle operating system 208, the vehicle firmware 206, the vehicle software application(s) 210, and/or other software, firmware, and/or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the vehicle processor 203. The vehicle memory 204 may be configured substantially similar to memory 604 discussed with respect to FIG. 6. It is understood that one or more instances of the vehicle memory 204 can be included in one or more of the components of the vehicle 201 (and/or the WCE 102 from FIG. 1), such as the vehicle head unit 211 (and/or the head unit 103) and/or the telematics control unit 209 (and/or the telematics control unit 104). As such, in the claims, the use of the phrase "vehicle memory" (or variations thereof) does not include waves or signals per se and/or communication media.

The vehicle firmware 206, which in some embodiments may also be known as microcode, can be written onto a ROM of the vehicle memory 204. The vehicle firmware 206 can be written on the ROM at the time of manufacturing and is used to execute programs on the vehicle processor 203. In some embodiments, the vehicle firmware 206 includes the vehicle operating system 208. In some embodiments, the vehicle firmware 206 is the vehicle operating system 208. In some embodiments, the vehicle firmware 206 and the vehicle operating system 208 are closely integrated for performance of operations of the vehicle 201.

The vehicle operating system 208 can control the operation of at least a portion of the vehicle 201. In some embodiments, the vehicle operating system 208 includes the functionality of the vehicle firmware 206 and/or the vehicle software application(s) 210. The vehicle operating system 208 can be executed by the vehicle processor 203 to cause the vehicle 201 to perform various operations. The vehicle operating system 208 can include, by way of example without limitation, a member of the SYMBIAN OS family of operating systems from SYMBIAN LIMITED; a member of the WINDOWS OS, WINDOWS MOBILE OS, and/or WINDOWS PHONE OS families of operating systems from MICROSOFT CORPORATION; a member of the PALM WEBOS family of operating systems from HEWLETT PACKARD CORPORATION; a member of the BLACKBERRY OS family of operating systems from RESEARCH IN MOTION LIMITED; a member of the IOS family of operating systems, a memory of the CARPLAY family of operating systems, and/or a member of the OS X family of operating systems from APPLE INC.; a member of the ANDROID OS family and/or the ANDROID AUTO family of operating systems from GOOGLE INC.; an open-source software operating system build around the LINUX kernel; a member of a real-time operating system; a member of a portable operating system interface automotive open system architecture and/or other operating systems. These operating systems are merely illustrative of some contemplated operating systems that may be used in accordance with various embodiments of the concepts and technologies described herein and therefore should not be construed as being limiting in any way. The vehicle software application(s) 210 can execute on top of the vehicle operating system 208. The vehicle software application(s) 210 can be executed by the vehicle processor 203 to cause the vehicle 201 (and/or components thereof, such as the vehicle head unit 211 and/or the telematics control unit 209) to perform various operations described herein. For example, the vehicle software application(s) 210 can be part of a vehicle entertainment system, a vehicle navigation system, a vehicle "ECU", and/or another computing system of the user vehicle. In some embodiments, the vehicle software application(s) 210 can include one or more instances of the applications that interact or otherwise communicate with the WPT service 124 and/or the WPTC 150 for wireless power transfer, according to various aspects discussed with respect to FIG. 1.

In some embodiments, the telematics control unit 209 may include and/or control the vehicle wireless communications components 212 discussed below. In some embodiments, the TCU 104 discussed with respect to FIG. 1 may be configured substantially similar to the telematics control unit 209. The telematics control unit 209 can include one or more instances of the vehicle processor 203, the vehicle memory 204, the vehicle operating system 208, and/or the vehicle firmware 206. The telematics control unit 209 may be configured to control the inflow and/or outflow of communications to and/or from the vehicle 201 via one or more of the vehicle wireless communications components 212. In various embodiments, the telematics control unit 209 can control, provide, and/or facilitate wireless tracking, wireless diagnostics, device pairing, crash notification, and other communication to/from the vehicle 201. In various embodiments, the telematics control unit 209 can include circuitry that operates as a network interface controller and can provide communication to the vehicle head unit 211 and/or one or more vehicle software application(s) 210. In various embodiments, the telematics control unit 209 can perform one or more functions and/or operations discussed herein, such as but not limited to operations discussed with respect to FIG. 1, FIG. 3, and/or FIG. 4.

The head unit 103 discussed above with respect to FIG. 1 may be configured substantially similar to the vehicle head unit 211. In some embodiments, the vehicle head unit 211 can include the display 211A that can be configured to present and/or provide audio output and/or video output via one or more user interface. The display 211A of the vehicle head unit 211 can have a display device that presents various user interfaces, requests, messages, and/or any other information (e.g., any of the messages, commands, requests, responses, and/or identifiers from FIG. 1) to a user or other occupant associated with the vehicle 201. In some embodiments, the input/output component 211B can provide a user touch-screen, audio speakers, microphones, haptic feedback system, or other input and/or output device or component that can alert a user to various communications. As such, an instance of the input/output component 211B and/or the display 211A can be implemented to enable the input to be provided to the head unit 103 of the WCE 102.

The vehicle wireless communications component 212 can include one or more wireless wide area network ("WWAN") components (e.g., radio transceivers, antenna, etc.) capable of facilitating communication with one or more WWANs, such as the network 120 and/or the RAN 132. In some embodiments, one or more instances of the vehicle wireless communications component 212 can be configured to provide multimode wireless connectivity. For example, the vehicle wireless communications component 212 may be configured to provide connectivity to the network 120 and/or the RAN 132 and may provide functions in accordance with UMTS, LTE, 5G and New Radio standards, or via some other combination of technologies, and more particularly, one or more technologies that support cell broadcast functionality. In various embodiments, the vehicle wireless communications component 212 can include one or more instances of a transceiver, sensors, cameras, circuitry, antennas, and any other components that can support and facilitate sending and/or receiving communications over the vehicle communication interface 218 using the direct transmission mode 219 and/or the network communication interface 220 using the network transmission mode 221. In some embodiments, the vehicle communication interface 218 can be provided and/or hosted by the DSRC component 214 and/or the C-V2X component 216.

The direct transmission mode 219 refers to a communication routine (which may be executed by the telematics control unit 209) by which a vehicle can communicate messages to/from another device (while within each other's communication range) without the messages being passed through an intermediary device of the network (e.g., without being handled by any of the network edge devices 140, 160, 164). In some embodiments, the direct transmission mode 219 can be provided over an 802.11x protocol (e.g., 802.11p or protocol within the 802.11 family of wireless local area network standards), which in some embodiments may be referred to as protocols and/or standards for dedicated short-range communications ("DSRC"). In some embodiments, the direct transmission mode 219 can be provided using specifications pertaining to cellular V2X ("C-V2X"), which is initially defined by the Third Generation Partnership Project ("3GPP") Release 14, discussed in Release 15 and later. In various embodiments, standards and protocols of C-V2X may allow communication components to be configured to support the direct transmission mode 219 (e.g., via a PC5 interface) and the network transmission mode 221 (e.g., via a Uu interface). The vehicle communication interface 218 can be configured to use, support, and provide the direct transmission mode 219, and the network communication interface 220 can be configured to use, support, and provide the network transmission mode 221. In various embodiments, the network transmission mode 221 refers to a vehicle communication routine (which may be executed by the telematics control unit 209) by which the vehicle wireless communications component 212 uses and communicates with network infrastructure (e.g., network edge devices of the network 120 and/or the RAN 132) to transmit various communications that are directed to one or more device through an access point of the network (i.e., network infrastructure), such as an instance of the network access point 152 that can be included in the NED 140, the NED 160, and/or the NED 164. In some embodiments, one or more instances of a communication (e.g., any of the power charge message 170, the current charge profile 172, the adjustment instruction 174, the charge preparation command 180, and/or the charge preparation command 182) may be generated and/or received with a configuration that facilitates and supports the use of the network transmission mode 221.

The DSRC component 214 can be a radio communications device and/or circuitry that can send and receive various communications (not shown) using the direct transmission mode 219. In some embodiments, the DSRC component 214 is configured to operate within a 5.9 GHz radio frequency band as defined by the United States Department of Transportation. In some embodiments, the DSRC component 214 is configured to operate within other radio frequency bands. In some embodiments, the DSRC component 214 can operate using 802.11p or other technology.

The C-V2X component 216 can be a radio communications device and/or circuitry that can send and receive V2X communications using the direct transmission mode 219 and/or the network transmission mode 221. In some embodiments, the C-V2X component 216 can operate in accordance with 3GPP Release 14 or later. The C-V2X component 216 can support and provide the vehicle communication interface 218 and/or the network communication interface 220. In various embodiments, the C-V2X component 216 can be configured to support 5G New Radio transmissions and direct communication transmissions so that communications may occur within and/or outside of a direct communication range. In some embodiments, the C-V2X component 216 can transmit and receive communications over the direct transmission mode within an ITS spectrum, such as a 5.9 GHz ITS band. In some embodiments, the C-V2X component 216 can provide transmission latency that is no more than a defined amount of milliseconds (e.g., less than 10 milliseconds). In some embodiments, the TCU 209 can include, and/or be configured to invoke, the C-V2X component 216 and/or the DSRC component 214. It should be understood that the embodiment of the vehicle 201 illustrated in FIG. 2 is provided as an example of a possible implementation of the WCE 102 and/or the WCE 118 discussed with respect to FIG. 1. The examples provided are for illustration purposes only, and therefore should not be construed as limiting in any way.

Figure 3:
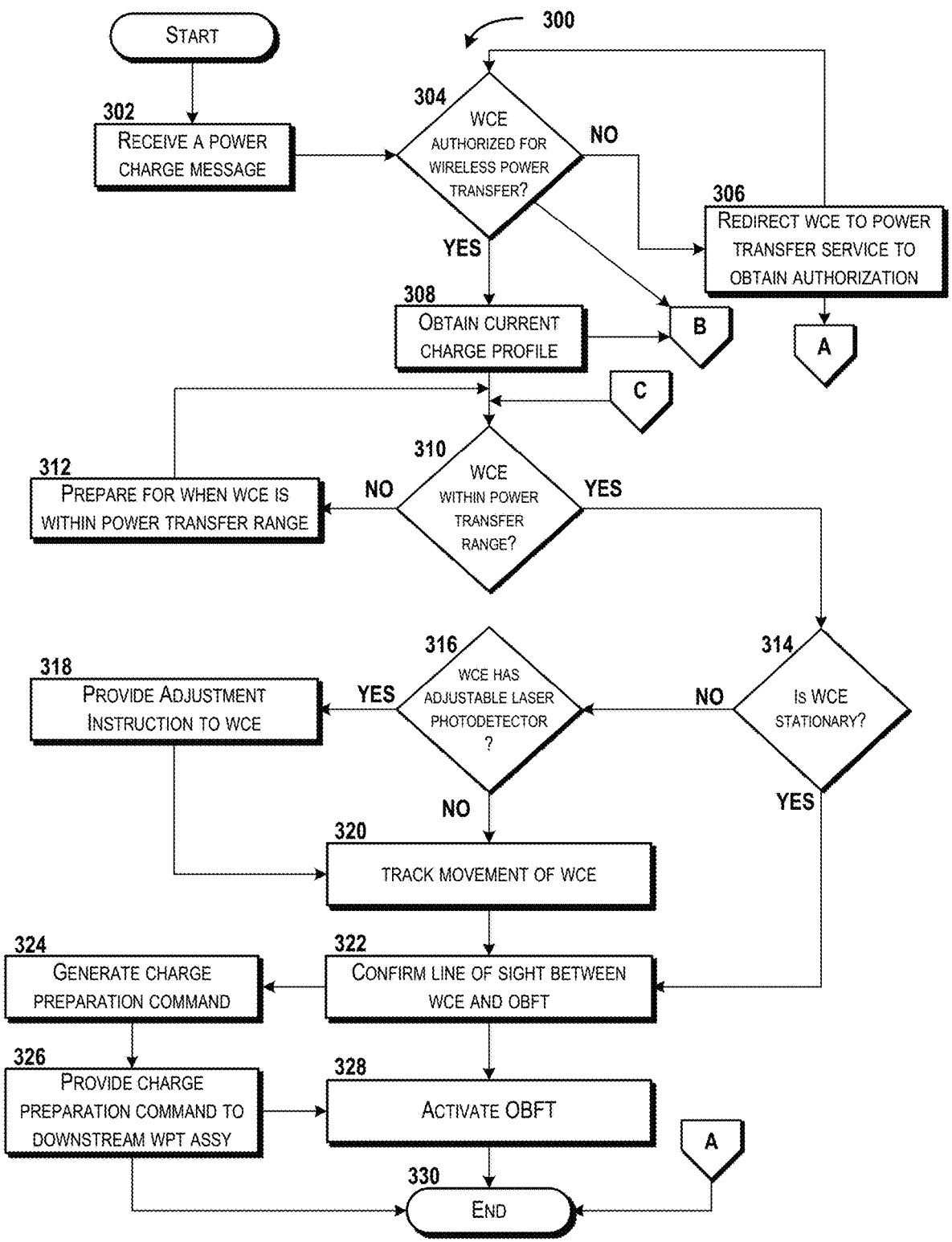
FIG. 3 is a flow diagram illustrating aspects of a method for wireless power transfer network management, according to an illustrative embodiment.
Figure 4:
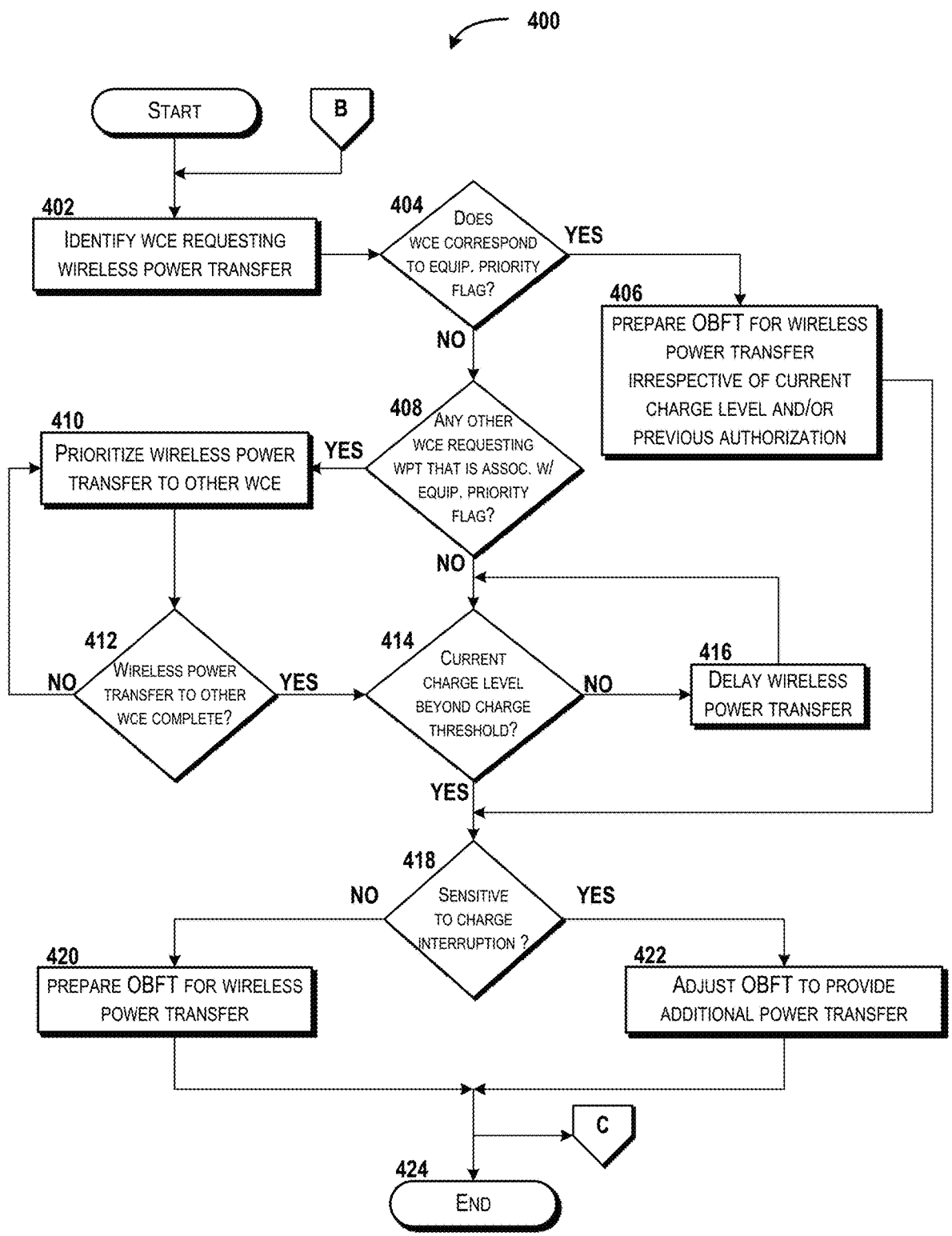
FIG. 4 is a flow diagram illustrating aspects of another method for facilitating wireless power transfer network management, according to an illustrative embodiment.

Turning now to FIGS. 3 and 4 with continued references to FIGS. 1 and 2, aspects of a method 300 and a method 400 for embodiments pertaining to aspects of connected vehicle network access optimization will be described in detail, according to various illustrative embodiments. It should be understood that each of the operations of the one or more methods disclosed herein (e.g., the method 300 and/or the method 400 discussed below) are not necessarily presented in any particular order and that performance of some or all of the operations in an alternate order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The phrases "computer executable instructions," and variants thereof (e.g., "computer-readable instructions"), as used herein, is used expansively to include routines, applications, modules, scripts, programs, plug-ins, data structures, algorithms, and the like. It is understood that any use of the term "module" (in the specification and claims) refers to a defined, callable set of computer-readable and executable instructions that, upon execution by a processor, configure at least a processor to perform at least a portion of one or more operations and functions discussed herein so as to transform, upon execution, processing resources and/or memory resources into a particular, non-generic, machine. Computer-readable instructions can be implemented on various system configurations including but not limited to one or more of single-processor or multiprocessor systems, minicomputers, user equipment, mainframe computers, personal computers, network servers, hand-held computing devices, microprocessor-based, programmable consumer electronics, a network platform, edge devices, vehicles, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system so as to provide a particular, non-generic machine device. The implementation is a matter of choice dependent on the performance and other requirements of the computing system. Accordingly, the logical operations described herein are referred to variously as states, operations, structural devices, acts, functions, instructions, and/or modules. These states, operations, structural devices, acts, functions, instructions, and/or modules may be implemented in software, in firmware, in special purpose digital logic, and any combination thereof. As used herein, the phrase "cause a processor to perform operations" and variants thereof is used to refer to causing and transforming a processor of a computing system or device, such as any component within one or more of the WCE 102, the WCE 118, the network 120, the RAN 132, network server 122, the NED 140, the NED 160, and/or the NED 164, to perform one or more operations and/or causing one or more instances of a processor to direct other components of a computing system or device, to perform one or more of the operations.

For purposes of illustrating and describing the concepts of the present disclosure, one or more of the operations of methods disclosed herein are described as being performed by one or more instance of the NED 140 via execution of one or more computer-readable instructions configured so as to instruct and transform a processor, such as the WPTC 150 that can configure the processor 154. In some embodiments, one or more operations may be performed by one or more of the network server 122, the WPT assembly 141, the network access point 152, the NED 160, and/or the NED 164. It should be understood that additional and/or alternative devices and/or network infrastructure devices can, in some embodiments, provide the functionality described herein via execution of one or more routines, applications, and/or other software including, but not limited to, the WPT service 124, the vehicle software application(s) 210, the vehicle firmware 206, the vehicle operating system 208, and/or any other computer executable instructions that can configure a device discussed herein, such as but not limited to one or more of the network server 122, WCE 102, the WCE 118, the NED 140, the NED 160, and/or the NED 164. Thus, the illustrated embodiments are illustrative, and should not be viewed as being limiting in any way.

In various embodiments, one or more instances of a computer system associated with the WPT service 124 may execute so as to cause one or more processor (e.g., an instance of the processor 121 and/or the processor 154) to perform at least a portion of one or more operations discussed herein. In various embodiments, execution of the WPTC 150 can cause one or more instances of a NED 140 (and any components therein, such as the WPT assembly 141 and/or the network access point 152) to perform one or more operations discussed herein. It should be understood that the examples provided are for illustration purposes only, and therefore should not be construed as limiting in any way. The method 300 and the method 400 will be described with reference to one or more of the FIGS. 1 and 2.

Turning now to FIG. 3, the method 300 can begin and proceed to operation 302, where the NED 140 can receive a power charge message, such as the power charge message 170. In some embodiments, the power charge message 170 may be provided to the NED 140 directly from a WCE which is requesting wireless power transfer, such as the WCE 102. In some embodiments, the power charge message 170 may have been sent to the network server 122 by way of another instance of the network access point 152 and/or the network 120, and therefore the NED 140 may receive the power charge message 170 from the network server 122. In various embodiments, the power charge message 170 corresponds to one or more instances of a WCE that is requesting or otherwise is capable of receiving laser-based wireless power transfer to charge a battery system of the WCE, such as the WCE 102 that can engage in the laser-based wireless power transfer to recharge the rechargeable battery cell 106 of the battery system 105. In some embodiments, the power charge message 170 can include a wirelessly chargeable equipment identifier and a location identifier corresponding to the WCE that is capable of receiving laser-based wireless power transfer, such as the WCE identifier 108 and the location identifier 109 corresponding to the WCE 102.

From operation 302, the method 300 can proceed to operation 304, where the WPTC 150 can determine whether a WCE (e.g., the WCE 102) requesting wireless power transfer is authorized to receive the wireless power transfer. In some embodiments, the WPTC 150 may have access to, or otherwise utilize, the power authorization map 126 that can be maintained by the WPT service 124 of the network server 122. The WPTC 150 can compare the WCE identifier 108 corresponding to the requesting WCE (i.e., the WCE 102) with the authorized identifiers 127A-N of the power authorization map 126, where the authorized identifiers 127A-N indicate that a corresponding WCE is authorized to receive wireless power transfer. In some embodiments, one or more other operations may be performed before wireless power transfer is actually provided, such as operations discussed with respect to method 400 provided below. In some embodiments, if the WPTC 150 and/or the WPT service 124 determines that the WCE identifier 108 matches or otherwise corresponds with one of the authorized identifiers 127A-N, then the corresponding WCE (e.g., the WCE 102) is authorized to receive wireless power transfer. Responsive to determining that the WCE 102 is authorized to receive wireless power transfer, the method 300 can proceed along the YES path to operation 308, which will be discussed below. In some embodiments, if the WPTC 150 and/or the WPT service 124 determines that the WCE identifier 108 does not match or otherwise cannot be found to correspond with one of the authorized identifiers 127A-N, then the corresponding WCE (e.g., the WCE 102) may not yet be authorized to receive wireless power transfer. In some embodiments, responsive to determining that the WCE 102 is not authorized and/or not yet authorized to receive wireless power transfer, the method 300 may proceed along the NO path to operation 306. In some embodiments, one or more operations discussed with respect to method 400 may occur prior to and/or concurrent with operation 304, such as operation 404 and/or operation 406. Therefore, it is understood that the examples provided are for illustration purposes only, and therefore should not be construed as limiting in any way. For clarity purposes a discussion of the method 300 proceeding along the NO path to operation 306 will be provided first, followed by a discussion proceeding along the YES path to operation 308.

At operation 306, the WPTC 150 can redirect the particular WCE corresponding to the power charge message 170 (e.g., the WCE 102) to the WPT service 124 so as to allow the WCE 102 to become a client of the WPT service 124, and in turn become authorized to engage in laser-based wireless power transfer. In some embodiments, the WPT service 124 can provide, host, and/or maintain a portal by which the WCE 102 can access and become a client of the WPT service 124, which in turn can cause the WPT service 124 to instantiate the WCE identifier 108 of the WCE 102 among the authorized identifiers 127A-N. In some embodiments, responsive to redirecting the WCE 102 to the WPT service 124 to obtain authorization, the method 300 may proceed from operation 306 to operation 304 discussed above. In some embodiments, the method 300 may proceed from operation 306 to operation 330, where the method 300 may end.

Returning to operation 304, in some embodiments, the method 300 may proceed along the YES path to operation 308, where the WPTC 150 can obtain a current charge profile corresponding to the particular WCE, such as the current charge profile 172 corresponding to the WCE 102. In some embodiments, the current charge profile 172 can include one or more instances of the charge criticality indicator 110 and the current charge level 107 of the WCE 102. In some embodiments, the current charge profile 172 may be obtained directly from the WCE 102, from the network server 122, and/or via the network 120. In some embodiments, the current charge profile 172 can be used to determine the priority of delivery of wireless power transfer to the WCE 102. In some embodiments, WPTC 150 can configure the OBFT 142 so as to adjust how wireless power transfer is delivered based on the current charge profile 172. In some embodiments, one or more operations pertaining to the method 400 from FIG. 4 may be performed in addition to any operation discussed with respect to the method 300. Further discussion of operations pertaining to the method 400 are discussed below with respect to FIG. 4.

In various embodiments, the method 300 can proceed to operation 310, where the WPTC 150 can determine whether the WCE 102 is within a power transfer range of the particular NED that is assigned to provide wireless power transfer to the WCE 102. For example, the WPTC 150 and/or the WPT service 124 may determine that the NED 140 is closest to the WCE 102 and/or will intercept the path of the WCE 102, and therefore the WPT service 124 may assign or otherwise designate the NED 140 to service the WCE 102. Therefore, in some embodiments, the NED 140 may determine whether the WCE 102 is within the power transfer range 149, which corresponds to the coverage area that laser-based wireless power transfer can be provided by the NED 140.

In some embodiments, if the NED 140 determines that the WCE 102 is not within the power transfer range 149, then the method 300 can proceed along the NO path to operation 312, where the NED 140 can prepare for when the WCE 102 is within the power transfer range 149 of the NED 140. For example, the NED 140 can use one or more instances of the location identifier 109 and/or the corresponding instance of an equipment profile (e.g., from among the equipment profiles 128A-N) to determine the direction 113 and velocity 114 of the WCE 102, thereby enabling the NED 140 to determine an estimated time which the WCE 102 will arrive within the power transfer range 149. In some embodiments, the WPT assembly 141 of the NED 140 may adjust the OBFT 142 to be oriented in a direction of the WCE 102, thereby maximizing the amount of laser-based wireless power transfer while the WCE 102 is within the power transfer range 149. In some embodiments, from operation 312, the method 300 may continue to monitor or otherwise determine whether the WCE 102 has entered the power transfer range 149, and therefore the method 300 may proceed back to operation 310.

Returning to operation 310, in some embodiments, if the NED 140 determines that the WCE 102 is within the power transfer range 149, then the method 300 can proceed along the YES path to operation 314, where the NED 140 can determine whether the WCE 102 is stationary (i.e., not moving within the power transfer range 149 of the NED 140). In some embodiments, the NED 140 can determine whether the WCE 102 is stationary or not stationary (i.e., moving or not moving) based on one or more instances of the location identifier 109 and/or historical location information in a corresponding instance of an equipment profile from the equipment profiles 128A-N. For example, if the latest instance of the location identifier 109 provides geographic information indicating that the WCE 102 is within the geographic range provided by the power transfer range 149 of the NED 140, then the WCE 102 may be considered to be within the power transfer range 149. Therefore, if multiple instances of the location identifier 109 corresponding to the WCE 102 are received by the NED 140 and indicate multiple different geographic positions within the power transfer range 149, then the NED 140 may determine that the WCE 102 is not stationary within the power transfer range 149. Similarly, if instances of the location identifier 109 does not change over time, and thus the geographic location remains within the power transfer range 149 without changing, then the NED 140 can determine that the WCE 102 is stationary within the power transfer range 149. In some embodiments, the NED 140 may implement or otherwise activate one or more of the equipment detection components 148, which can include activating a video camera to detect and identify the WCE 102. If the equipment detection components 148 identifies the WCE 102 (e.g., based on image analysis and object recognition) and determines that the WCE 102 is within the power transfer range 149, then the equipment detection components 148 may determine whether there is a change in the geographic position of the WCE 102, which in turn enables determination of whether the WCE 102 is stationary or not stationary.

Therefore, in various embodiments, if the NED 140 determines that the WCE 102 is stationary, then the method 300 may proceed along the YES path from operation 314 to operation 322, which will be discussed below in further detail. Returning to operation 314, in some embodiments, if the NED 140 determines that the WCE 102 is not stationary, then the method 300 can proceed along the NO path from operation 314 to operation 316. For clarity purposes a discussion of the method 300 proceeding along the NO path (i.e., based on a determination that the WCE 102 is not stationary and thus moving within the power transfer range 149) to operation 316 will be provided first, followed by a discussion below of operation 322.

At operation 316, in some embodiments, the NED 140 may determine whether the WCE 102 has an instance of the adjustable laser photodetector 111. In some embodiments, the WCE 102 may indicate the presence of the adjustable laser photodetector 111 within the power charge message 170. In some embodiments, an equipment profile corresponding to the WCE 102 (e.g., form among the equipment profiles 128A-N) can indicate whether the WCE 102 is configured to have the adjustable laser photodetector 111. In various embodiments, if the NED 140 determines that the WCE 102 does not have an instance of the adjustable laser photodetector 111, then the NED 140 can identify and locate the presence of an instance of the fixed photodetector 112 on the WCE 102. In some embodiments, if the NED 140 determines that the WCE 102 has or is otherwise configured with the adjustable laser photodetector 111, then the method 300 can proceed along the YES path from operation 316 to operation 318. In some embodiments, if the NED 140 determines that the WCE 102 does not have or is otherwise not configured with the adjustable laser photodetector 111, then the method 300 can proceed along the NO path from operation 316 to operation 320. For clarity purposes, a discussion of the method 300 proceeding along the YES path to operation 318 will be provided first, followed by a discussion of operation 320.

At operation 318, the NED 140 can prepare and provide the adjustment instruction 174 to the WCE 102 based on the WCE 102 having the adjustable laser photodetector 111. In some embodiments, the adjustment instruction 174 can provide the WCE 102 with location information of the NED 140 (e.g., the NED location identifier 129A). The adjustment instruction 174 can command the adjustable laser photodetector 111 (e.g., specifically the physical adjustment unit 111B) to reorient the PSPC 111C in a direction that faces or is otherwise pointed towards the NED 140. In some embodiments, the adjustment instruction 174 can command the physical adjustment unit 111B to rotate the PSPC 111C towards the OBFT 142 of the NED 140, and/or can instruct the adjustable laser photodetector 111 to adjust a vertical angle of the PSPC 111C so that the PSPC 111C is tilted up towards (and thus faces) the OBFT 142 of the NED 140. In some embodiments, the adjustment instruction 174 can instruct the adjustable laser photodetector 111 to maintain a line of sight between the OBFT 142 and the WCE 102, thereby optimizing laser-based wireless power transfer. From operation 318, the method 300 may proceed to operation 320, which is discussed below in further detail.

At operation 320, the NED 140 can track the movement of the WCE 102 before, during, and/or after the WCE 102 is within the power transfer range 149 of the NED 140. Specifically, while the WCE 102 is within the power transfer range 149, the NED 140 can activate the equipment detection components 148 to determine and confirm the speed, direction, and location of the WCE 102, which in turn can enable the WPT assembly 141 to adjust the movement of the OBFT 142 so as to follow the movement of the WCE 102. By this, the OBFT 142 may be able to provide targeted, direct laser-based wireless power transfer to the WCE 102, while preventing or otherwise avoiding wireless power transfer to another WCE (besides the WCE 102) that is within the power transfer range 149. Therefore, the NED 140 can provide individual wireless power transfer over extended distances (e.g., from tens of meters to hundreds of meters) to the WCE 102 while within the power transfer range 149.

From operation 320, the method 300 may proceed to operation 322, where the NED 140 may confirm a direct line of sight between the WCE 102 and the OBFT 142. The NED 140 may activate the equipment detection components 148 to confirm that the WCE 102 is not obstructed from receiving wireless power transfer. For example, in an embodiment, if an object (e.g., a tree, building, person, another WCE, etc.)

is physically blocking (partially or fully) the adjustable laser photodetector 111 and/or the fixed photodetector 112, then the NED 140 would not be able to confirm that line of sight exists between the OBFT 142 and the WCE 102. Therefore, the NED 140 may continue to check whether an obstruction exists between the OBFT 142 and the WCE 102. The NED 140 can confirm that line of sight exists between the OBFT 142 and the WCE 102 when the adjustable laser photodetector 111 and/or the fixed photodetector 112 is not obstructed from view of the OBFT 142. In some embodiments, the OBFT 142 may be activated and/or authorized to be activated responsive to confirming a direct line of sight between the OBFT 142 and the WCE 102. In some embodiments, the method 300 may proceed from operation 322 to operation 324, which will be discussed below in further detail. In some embodiments, operation 324 may be performed concurrent with operation 322. In some embodiments, the method 300 may proceed from operation 322 to operation 328. For clarity purposes, a discussion of operation 324 will be provided first, followed by a discussion of operation 328.

At operation 324, the NED 140 can generate an instance of a charge preparation command that can be directed to another NED that is located downstream of the WCE 102, such as any of the charge preparation commands 180, 182 that can be directed to the NEDs 160, 164, respectively, which are downstream from the NED 140. In some embodiments, the NED 140 can generate an instance of a charge preparation command (e.g., any of the charge preparation commands 180, 182) prior to the WCE 102 leaving the power transfer range 149 corresponding to the NED 140 and/or before the WCE 102 enters the power transfer range of the downstream NED, such as before entering the power transfer range 161 of the NED 160 and/or the power transfer range 165 of the NED 164. In some embodiments, an instance of a charge preparation command (e.g., any of the charge preparation commands 180, 182) can be directed for use by another instance of the WPT assembly 141 that can be located in the downstream NED, such as the downstream WPT assembly 162 of the NED 160. In various embodiments, the downstream WPT assembly 162 can include another OBFT (e.g., another instance of the OBFT 142) to provide wireless power transfer to the WCE 102. In some embodiments, the downstream WPT assembly 162 of the NED 160 can provide wireless power transfer to the WCE 102 while the NED 140 is currently providing wireless power transfer (i.e., both the WPT assembly 141 and the downstream WPT assembly 162 can concurrently generate separate instances of the laser beam 143 to provide wireless power transfer directly to the WCE 102) because the power transfer range 161 corresponding to the NED 160 may overlap with the power transfer range 149 corresponding to the NED 140. In some embodiments, the WPT assembly 162 may provide wireless power transfer to the WCE 102 once the WCE 102 leaves the power transfer range 149 of the NED 140 and is within the power transfer range 161 of the NED 160. In various embodiments, an instance of the charge preparation command (e.g., the charge preparation commands 180, 182) can instruct a downstream wireless power transfer assembly (e.g., the downstream WPT assembly 162) to prepare to provide wireless power transfer to the WCE 102, such as by providing current velocity, direction, and/or location information of the WCE 102 while the WCE 102 is within the power transfer range 149 of the NED 140.

From operation 324, the method 300 can proceed to operation 326, where the NED 140 can provide an instance of the charge preparation command (e.g., the charge preparation commands 180, 182) to another NED that includes a downstream wireless power transfer assembly (and thus another OBFT that provides wireless power transfer). For example, in some embodiments, the charge preparation command 180 can be provided to the NED 160 and the charge preparation command 182 can be provided to the NED 164. In various embodiments, each of the NEDs 160, 164 are elements that provide laser-based wireless power transfer for the WPT service 124, and therefore may coordinate one or more operations between various NED (e.g., any of the NEDs 140, 160, 164) so as to share information and/or data as to current and/or previous operations of wireless power transfer for a particular WCE (e.g., the WCE 102). In some embodiments, the method 300 may proceed from operation 326 to operation 330, where the method 300 may end. In some embodiments, the method 300 can proceed from operation 326 to operation 328.

At operation 328, the NED 140 may activate the OBFT 142 that generates the laser beam 143 and provides laser-based wireless power transfer to the WCE 102 while the WCE 102 is within the power transfer range 149 of the NED 140. In some embodiments, the NED 140 can configure or otherwise activate the OBFT 142 so as to provide bursts of wireless power transfer, such as by pulsing the OBFT 142 so that the laser beam 143 (and thus the wireless power transfer) is discontinuous. In some embodiments, the NED 140 can adjust the time interval between pulses of the OBFT 142 so that the amount of power transfer provided can be increased and/or decreased based on the length of the time interval. For example, a shorter time interval between pulses of the OBFT 142 can increase the amount of wireless power transfer to the WCE 102, while increasing the time interval between pulses of the OBFT 142 can decrease the amount of wireless power transfer to the WCE 102. Further discussion of possible embodiments are provided with respect to method 400 illustrated in FIG. 4.

From operation 328, the method 300 can proceed to operation 330, where the method 300 may end. The method 300 may, in various embodiments, proceed to or include one or more operations of the method 400, which is discussed below with respect to FIG. 4. In some embodiments, one or more of the operations of the method 300 may be performed by the NED 140 (e.g., by any components included therein, such as but not limited to the WPTC 150, the WPT assembly 141, the OBFT 142, the network access point 152, etc.) so as to cause another NED (e.g., the NED 160 and/or the NED 164) and/or an element thereof (e.g., a downstream WPT assembly 162, which in turn can include another instance of the OBFT 142) to perform one or more of the operations discussed herein. It should be understood that the examples provided are for illustration purposes only, and therefore should not be construed as limiting in any way.

Turning now to FIG. 4, the method 400 for facilitating wireless power transfer network management is disclosed, according to an illustrative embodiment. In an embodiment, the method 400 can be performed by any of a plurality of network edge devices, such as any of the NED 140, the NED 160, and/or the NED 164. Instances of the processor 154 can be executed and configured, at least in part, by an instance of the WPTC 150 and/or the WPT service 124. For clarity purposes, the method 400 will be described as being performed by the NED 140, although it is understood that this may not necessarily be the case for all embodiments. It is understood that, in various embodiments, one or more of the operations, in whole or in part, may be performed by an instance of a network edge device (e.g., any of the NEDs 140, 160, and/or 164), the network server 122, and/or components included therein (e.g., the WPTC 150, the WPT assembly 141, the OBFT 142, the network access point 152, etc.). It should be understood that the examples provided are for illustration purposes only, and therefore should not be construed as limiting in any way.

In some embodiments, the method 400 can begin at operation 402, where the WPTC 150 and/or the WPT service 124 can identify the particular WCE that is requesting wireless power transfer, such as the WCE 102. For example, the WPTC 150 can analyze the WCE identifier 108 that is included in the power charge message 170, and in turn can identify one of the equipment profiles 128A-N that matches the WCE identifier 108, thereby enabling identification of the WCE 102.

From operation 402, the method 400 can proceed to operation 404, where WPTC 150 and/or the WPT service 124 can determine whether the WCE 102 is associated with, or otherwise corresponds to an instance of the equipment priority flag 125. For example, if the WCE 102 is an emergency vehicle or otherwise is considered equipment that should be prioritized for wireless power transfer, then the equipment profile corresponding to the WCE 102 may have or otherwise point to the equipment priority flag 125. In some embodiments, if the WPTC 150 and/or WPT service 124 determines that the WCE 102 is associated with or otherwise corresponds to an instance of the equipment priority flag 125, then the method 400 may proceed along the YES path from operation 404 to operation 406. For clarity purposes, a discussion of the method 400 proceeding along the YES path to operation 406 will be provided first, followed by a discussion of the method 400 proceeding along the NO path to operation 408.

At operation 406, NED 140 may prepare the OBFT 142 to provide wireless power transfer based on the WCE 102 being prioritized for laser-based wireless power transfer due to the equipment priority flag 125. For example, in some embodiments, the NED 140 may prepare the OBFT 142 to provide wireless power transfer to the WCE 102 upon the WCE 102 entering the power transfer range 149 of the NED 140. In some embodiments, when the WCE 102 is associated with or otherwise corresponds to an instance of the equipment priority flag 125, the NED 140 may provide wireless power transfer to the WCE 102 irrespective of whether or not the WCE 102 has previously been authorized to use the WPT service 124. For example, if the WPTC 150 and/or the WPT service 124 recognizes that the WCE 102 is an emergency vehicle, then although the WCE 102 may not have an active subscription and/or account with a service provider of the WPT service 124, the NED 140 may still be authorized to provide wireless power transfer to the WCE 102. In some embodiments, the NED 140 may be configured to provide wireless power transfer only when the WCE 102 has a current charge level (e.g., the current charge level 107) that is below the charge threshold 123. However, in some embodiments, when the WCE 102 is associated with or otherwise corresponds to an instance of the equipment priority flag 125, the NED 140 may instruct the OBFT 142 to provide wireless power transfer to the WCE 102 irrespective of the current charge level 107 of the WCE 102. In some embodiments, the method 400 may proceed from operation 406 to operation 418, discussed below in further detail.

Returning to operation 404, in some embodiments, if the WPTC 150 and/or the WPT service 124 determines that the WCE 102 does not correspond with an instance of the equipment priority flag 125, then the method 400 may proceed along the NO path to operation 408, where the WPTC 150 and/or the WPT service 124 can determine whether another WCE (e.g., the WCE 118) is associated with an instance of the equipment priority flag 125 and is requesting wireless power transfer. For example, in an embodiment in which the WCE 118 requests wireless power transfer and corresponds with an instance of the equipment priority flag 125, then WPTC 150 and/or the WPT service 124 may attempt to provide wireless power transfer to the WCE 118 before providing wireless power transfer to the WCE 102. Therefore, in some embodiments, if another WCE (e.g., the WCE 118) is associated with the equipment priority flag 125 and is requesting wireless power transfer, then the method 400 may proceed along the YES path from operation 408 to operation 410. In some embodiments, if another WCE (e.g., the WCE 118) is not requesting wireless power transfer and/or is not associated with the equipment priority flag 125, then the method 400 may proceed along the NO path from operation 408 to operation 414. For clarity purposes, a discussion following the YES path from operation 408 to operation 410 will proceed first, followed by a discussion of operation 414.

At operation 410, the WPTC 150 and/or the WPT service 124 may prioritize wireless power transfer to the particular WCE that is associated with the equipment priority flag 125 (e.g., in an embodiment the WCE 118) such that the WCE 118 is provided wireless power transfer before the WCE 102. As such, one or more of the NEDs 140, 160, 164 may provide wireless power transfer to the WCE 118 before providing wireless power transfer to the WCE 102. From operation 410, the method 400 may proceed to operation 412, where the WPTC 150 and/or the WPT service 124 may determine whether a particular NED (e.g., the NED 140) has completed providing wireless power transfer to the other WCE (e.g., the WCE 118), such as due to the WCE 118 leaving the power transfer range 149 of the NED 140. In some embodiments, if a particular NED (e.g., the NED 140) has not yet completed providing wireless power transfer, but the NED 140 could still provide the WCE 102 with wireless power transfer, then the method 400 may proceed along the NO path from operation 412 to operation 410, where the WPTC 150 and/or the WPT service 124 can continue to prioritize the other WCE (e.g., the WCE 118) for wireless power delivery. In some embodiments, if a particular NED (e.g., the NED 140) has completed providing wireless power transfer, and the NED 140 can still provide the WCE 102 with wireless power transfer, then the method 400 may proceed along the YES path from operation 412 to operation 414.

At operation 414, the WPTC 150 and/or the WPT service 124 may determine whether the current charge level 107 of the WCE 102 is less than the charge threshold 123. The WPTC 150 and/or the WPT service 124 may be configured such that the OBFT 142 will be activated responsive to the current charge level 107 being below the charge threshold 123. Therefore, in some embodiments, if the current charge level 107 is above the charge threshold 123, then the method 400 may proceed along the NO path from operation 414 to operation 416, where the WPTC 150 and/or the WPT service 124 may delay providing wireless power transfer to the WCE 102 until the current charge level 107 is indicated to be below the charge threshold 123. As such, in some embodiments, the method 400 may proceed from operation 416 to operation 414 where the WPTC 150 and/or the WPT service 124 can continue to determine whether the current charge level 107 is below the charge threshold 123.

Returning to operation 414, in some embodiments, if the WPTC 150 and/or the WPT service 124 determines that the current charge level 107 is below the charge threshold 123, then the method 400 may proceed from operation 414 along the YES path to operation 418, where the WPTC 150 and/or the WPT service 124 can determine whether the WCE 102 is performing an operation that is sensitive to charge interruption, such as indicated by an instance of the charge criticality indicator 110.

In some embodiments, if the WPTC 150 and/or the WPT service 124 determines that the WCE 102 is not sensitive to charge interruptions, then the method 400 may proceed along the NO path to operation 420, where the WPTC 150 can prepare the OBFT 142 for wireless power transfer to the WCE 102 such that the OBFT 142 can begin providing wireless power transfer once the WCE 102 enters the power transfer range 149 of the NED 140. In some embodiments, the method 400 may proceed from operation 420 to one or more operations discussed with respect to method 300 illustrated in FIG. 3, such as the operation 310. In some embodiments, the method 400 may proceed from operation 420 to operation 424, where the method 400 may end.

Returning to operation 418, in some embodiments, if the WPTC 150 and/or the WPT service 124 determines that the WCE 102 is sensitive to charge interruptions, then the method 400 may proceed along the YES path from operation 418 to operation 422, where the WPTC 150 can adjust the OBFT 142 to provide additional power transfer to the WCE 102 while the WCE 102 is within the power transfer range 149 of the NED 140. For example, the WPTC 150 may decrease a time interval between pulses of wireless power transfer (i.e., pulses of the laser beam 143) and thus the OBFT 142 is activated more frequently than in a default configuration, thereby enabling additional wireless power transfer to the WCE 102 while the WCE 102 is within the power transfer range 149. In some embodiments, the method 400 may proceed from operation 422 to one or more operations discussed with respect to method 300 illustrated in FIG. 3, such as the operation 310. In some embodiments, the method 400 may proceed from operation 422 to operation 424, where the method 400 may end.

Figure 5:
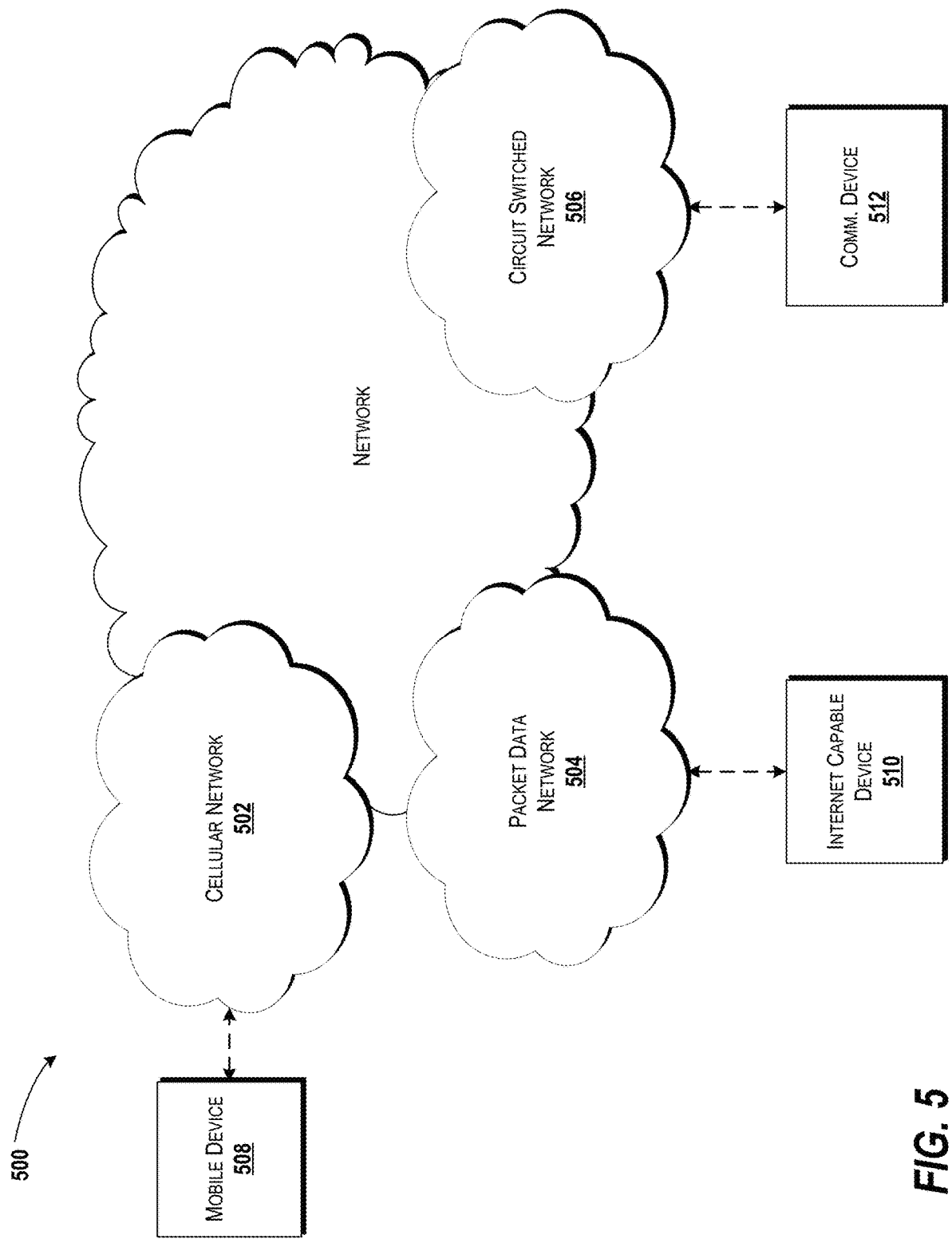
FIG. 5 is a diagram illustrating an example network capable of implementing aspects of the embodiments discussed herein.

Turning now to FIG. 5, a discussion of a network 500 is illustrated, according to an illustrative embodiment. The network 120 and/or the RAN 132 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), node-B's ("NBs"), e-Node-B's ("eNBs"), g-Node-B's ("gNBs"), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), 5G core components, 5G New Radio ("NR") components, functions, applications, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with, and/or otherwise configured to implement and support, mobile communications standards such as but not limited to 4G, LTE, LTE Advanced, and/or 5G NR, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communication device 512 can correspond with one or more computer systems, devices, and/or equipment discussed with respect to FIG. 1, such as but not limited to the WCE 102, the WCE 118, the network server 122, the NED 140, the NED 160, and/or the NED 164. In the specification, the network 120, the RAN 132, and/or the network 500 can refer broadly to, in some embodiments, any combination of the networks 502, 504, 506. It should be appreciated that substantially all of the functionality described with reference to the network 120, the RAN 132, and/or the network 500 can, in some embodiments, be performed by the cellular network 502, the packet data network 504, and/or the circuit switched network 506, alone or in combination with other networks, network elements, and the like.

Figure 6:
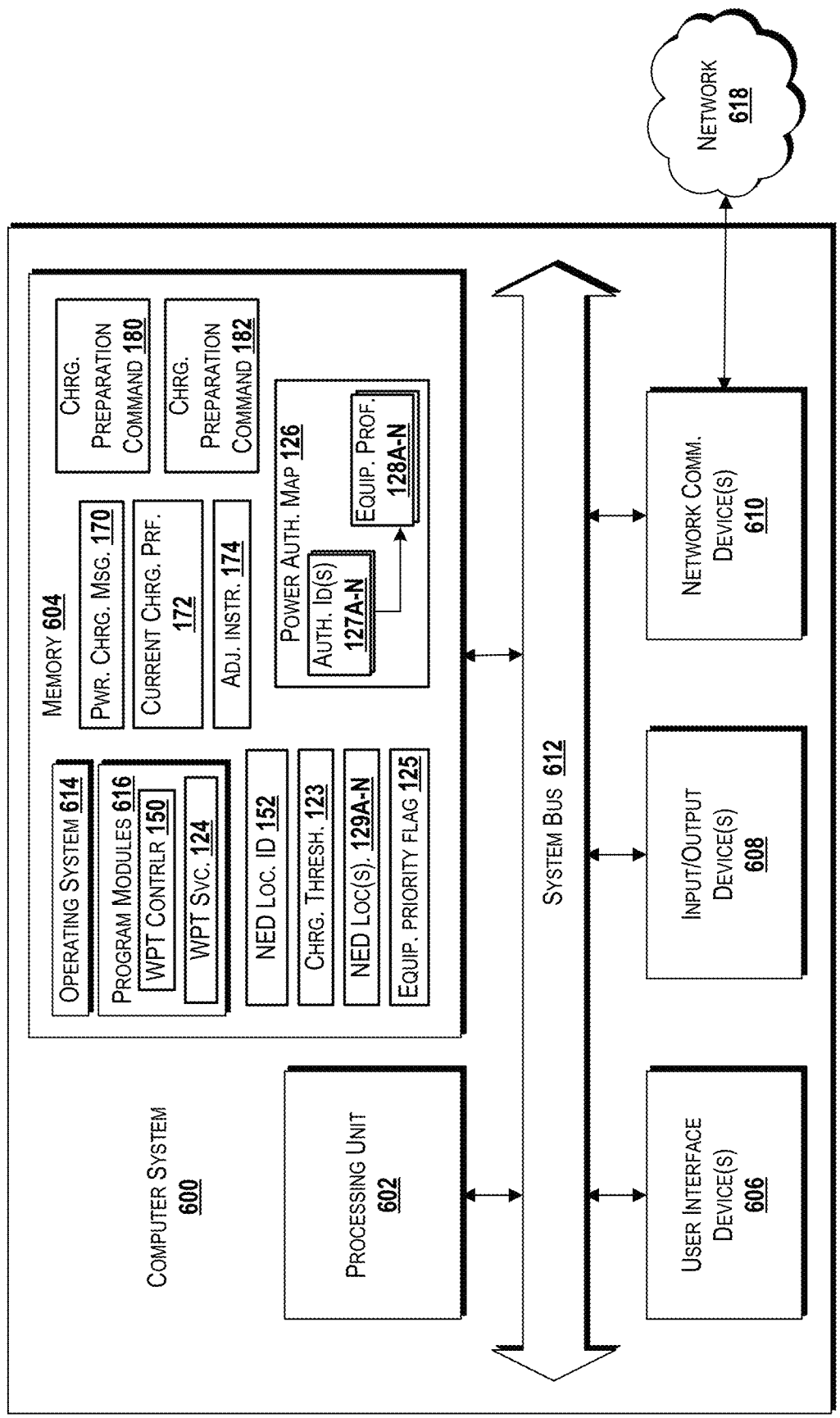
FIG. 6 is a block diagram illustrating an example computer system capable of implementing aspects of the embodiments presented and described herein.

FIG. 6 is a block diagram illustrating a computer system 600 can be configured to provide the functionality described herein related to wireless power transfer network management, in accordance with various embodiments of the concepts and technologies disclosed herein. In some embodiments, at least a portion of one or more of the WCE 102, the WCE 118, the network server 122, the NED 140, the NED 160, and/or the NED 164 illustrated and described herein can be configured as and/or can have an architecture similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network communication devices 610. In some embodiments, the vehicle processor 203 can be configured as, or at least similar to, an instance of the processing unit 602. In some embodiments, one or more instances of the processing unit 602 can be implemented within one or more devices and/or components of the operating environment 100, such as but not limited to one or more of the WCE 102, the WCE 118, the network server 122, the NED 140, the NED 160, and/or the NED 164. In some embodiments, the vehicle memory 204 can be configured substantially similar to the memory 604. In some embodiments, one or more instances of the memory 604 can be implemented within one or more devices and/or components of the operating environment 100, such as but not limited to one or more of the WCE 102, the WCE 118, the network server 122, the NED 140, the NED 160, and/or the NED 164. In various embodiments, one or more aspects of the NED 140 and/or the WCE 102 can be included within the computer system 600.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in sequence and/or parallel in a single machine or in multiple machines. Furthermore, processors and/or processing units can be used to support virtual processing environments. Processors and processing units also can include state machines, application-specific integrated circuits ("ASICs"), combinations thereof, or the like. As used herein, the phrase "processing unit" may be referred to as a "processor." The processing unit 602 can include one or more central processing units ("CPUs") configured with one or more processing cores. The processing unit 602 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processing unit 602 can include one or more discrete GPUs. In some other embodiments, the processing unit 602 can include CPU and GPU components that are configured in accordance with a co-processing CPU/GPU computing model, wherein the sequential part of an application executes on the CPU and the computationally-intensive part is accelerated by the GPU. The processing unit 602 can include one or more system-on-chip ("SoC") components along with one or more other components including, for example, a memory, a communication component, or some combination thereof. In various embodiments, an instance of a processor (e.g., the processing unit 602) can be and/or can include one or more SNAPDRAGON SoCs, a cellular V2X ("C-V2X") chipset, and/or another architecture available from QUALCOMM of San Diego, Calif.; one or more TEGRA SoCs and/or another architecture available from NVIDIA of Santa Clara, Calif.; one or more HUMMINGBIRD SoCs and/or another architecture available from SAMSUNG of Seoul, South Korea; one or more Open Multimedia Application Platform ("OMAP") SoCs and/or another architecture available from TEXAS INSTRUMENTS of Dallas, Tex.; one or more customized versions of any of the above SoCs; and/or one or more proprietary SoCs and/or proprietary circuitry capable of supporting V2X communication processing. In various embodiments, an instance of a processor (e.g., the processing unit 602) can be and/or can include one or more hardware components architected in accordance with an ARM architecture, available for license from ARM HOLDINGS of Cambridge, United Kingdom. Alternatively (or additionally), an instance of a processor (e.g., the processing unit 602) can be or can include one or more hardware components architected in accordance with an x86 architecture, such as an architecture available from INTEL CORPORATION of Mountain View, Calif., and others. Those skilled in the technology will appreciate that the implementation of a processor (e.g., the processing unit 602) can utilize various computation architectures, and as such, a processor (e.g., the processing unit 602) should not be construed as being limited to any particular computation architecture or combination of computation architectures, including those explicitly disclosed herein. Because processors and/or processing units are generally known to one of ordinary skill, the processors and processing units disclosed and discussed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. In some embodiments, for example, the program modules 616 can include the WPTC 150, the WPT service 124, and/or other computer-readable instructions. These and/or other programs can be embodied in computer-executable instructions that, when executed by the processing unit 602, can facilitate performance of one or more of the methods 300 and/or 400 described in detail above with respect to FIGS. 3 and 4. According to some embodiments, the program modules 616 may be embodied in hardware, software, firmware, or any combination thereof. It should be understood that the memory 604 also can be configured to store one or more instance of information and data discussed with respect to FIGS. 1, 2, 3, and 4, such as but not limited to the charge threshold 123, the power authorization map 126, the authorized identifiers 127A-N, the equipment profiles 128A-N, the NED location identifiers 129A-N, the equipment priority flag 125, the power charge message 170, the current charge profile 172, the adjustment instruction 174, the charge preparation command 180, the charge preparation command 182, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network communication devices 610 enable the computer system 600 to communicate with other networks or remote systems via a network, such as network 618. Examples of network communication devices 610 include, but are not limited to, a modem, a radio frequency ("RF") transceiver and/or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 618 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). In some embodiments, the network 618 may include one or more aspects of the network 500, discussed above. It should be understood that the examples provided are for illustration purposes only, and therefore should not be construed as limiting in any way.

Figure 7:
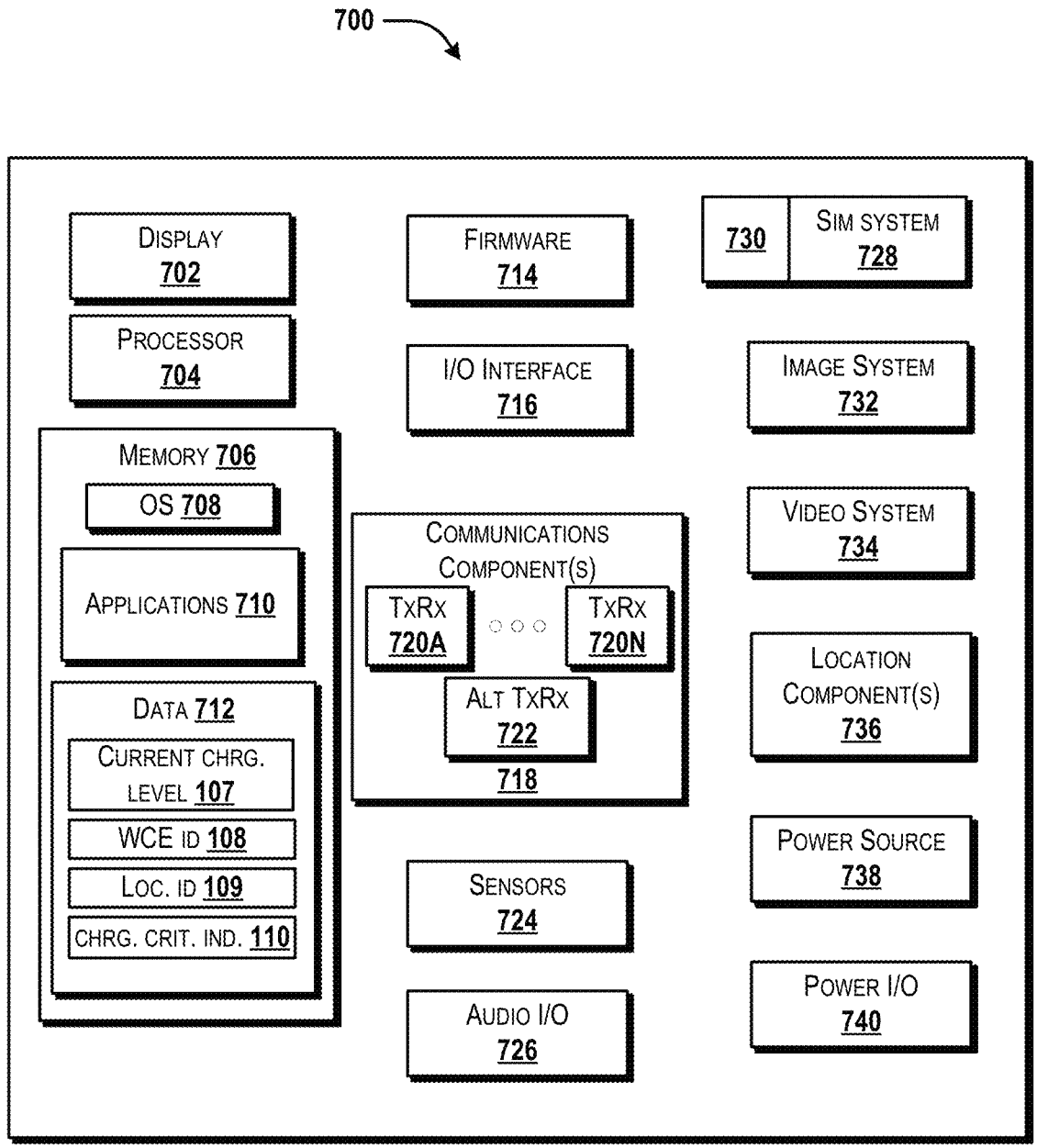
FIG. 7 is a diagram illustrating an example user equipment capable of implementing aspects of the concepts and technologies described herein according to embodiments of the present disclosure.

Turning now to FIG. 7, an illustrative user equipment 700 and components thereof will be described. In some embodiments, the WCE 102, the WCE 118 and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). In various embodiments, aspects from one or more the WCE 102 and/or the vehicle 201 can be configured or otherwise implemented in the user equipment 700. As such, an instance of wirelessly chargeable equipment (e.g., the WCE 102) and/or the vehicle 201 may include one or more aspects of the user equipment 700 discussed herein. Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an audiovisual content filter, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as a display application that can present various communications, messages, and/or other computer-executable instructions stored in a memory 706, or the like. In some embodiments, the applications 710 also can include a UI application (not illustrated in FIG. 7) and/or vehicle software applications, such as discussed with respect to FIG. 2.

The UI application can interface with the operating system 708 to facilitate any of the operations discussed herein and functionality for presenting content and/or data stored at and/or received by the user equipment 700 and/or stored elsewhere. It is understood that one or more instances of the operating system 708 may be included and operate within one or more systems discussed with respect to the operating environment 100, such as but not limited to the WCE 102 and/or the WCE 118. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in presenting content, interacting with the NED 140, engaging with the WPT service 124, presenting a vehicle communication, providing feedback or other information about the user equipment 700, presenting a condition identifier, configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. According to various embodiments, the data 712 can include, for example, instances of the current charge level 107, the WCE identifier 108, the location identifier 109, the charge criticality indicator 110, any other elements discussed with respect to FIGS. 1, 2, 3, and 4, presence applications, wireless power transfer information, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any system and/or device discussed in FIG. 1 (e.g., the WCE 102). The I/O interface 716 can be configured to support the input/output of data such as a message, communication, command, and/or instruction, and/or any other information or elements discussed with respect to FIGS. 1, 2, 3, and 4, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks (e.g., the network 120 and/or the RAN 132) and/or a network edge device (e.g., the NEDs 140, 160, 164) described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, LTE, LTE Advanced, 5G New Radio, and greater generation technology standards. Moreover, the communications component 718 may facilitate communications over various channel access methods (which may or may not be used by the aforementioned standards) including, but not limited to, TDMA, FDMA, W-CDMA, OFDMA, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like. In some embodiments, the communications component 718 can support one or more communication modes discussed with respect to FIG. 2, such as the direct transmission mode 219 over a PC5 interface and/or the network transmission mode 221 over a Uu interface.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, radars, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 maybe included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/ WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/ or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to wireless power transfer network management have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, acts, or mediums described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A system comprising:
an optical beamforming transmitter;
a processor; and
a memory that stores computer-executable instructions that, in response to execution by the processor, cause the processor to perform operations comprising:
receiving a power charge message that requests wireless power transfer to charge a battery system of a wirelessly chargeable equipment,
detecting that the wirelessly chargeable equipment is within a power transfer range of the optical beamforming transmitter,
determining that the wirelessly chargeable equipment is not stationary,
tracking movement of the wirelessly chargeable equipment,
determining that the wirelessly chargeable equipment includes an adjustable laser photodetector,
providing an adjustment instruction to the wirelessly chargeable equipment to command the adjustable laser photodetector of the wirelessly chargeable equipment to reorient towards the optical beamforming transmitter,
determining a charge criticality indicator associated with the wirelessly chargeable equipment, and
activating, based at least in part on the charge criticality indicator associated with the wirelessly chargeable equipment, the optical beamforming transmitter to provide wireless power transfer via a laser beam to the wirelessly chargeable equipment while the wirelessly chargeable equipment is within the power transfer range, wherein activating the optical beamforming transmitter comprises adjusting a time interval between pulses of the laser beam based at least in part on the charge criticality indicator associated with the wirelessly chargeable equipment.

2. The system of claim 1, wherein the operations further comprise obtaining a current charge profile corresponding to the wirelessly chargeable equipment, wherein the current charge profile includes the charge criticality indicator and a current charge level.

3. The system of claim 1, wherein the power charge message comprises a wirelessly chargeable equipment identifier and a location identifier.

4. The system of claim 1, wherein the operations further comprise determining whether the wirelessly chargeable equipment is authorized to receive the wireless power transfer.

5. The system of claim 1, wherein the operations further comprise:
prior to the wirelessly chargeable equipment leaving the power transfer range, generating a charge preparation command that is directed to a downstream wireless power transfer assembly that is located outside of the power transfer range; and
providing the charge preparation command to the downstream wireless power transfer assembly that is located outside of the power transfer range.

6. The system of claim 5, wherein the charge preparation command instructs the downstream wireless power transfer assembly to prepare to provide wireless power transfer for the wirelessly chargeable equipment.

7. The system of claim 1, wherein the optical beamforming transmitter is activated responsive to confirming a direct line of sight with the wirelessly chargeable equipment.

8. A method comprising:
receiving, by a system comprising an optical beamforming transmitter, a power charge message that requests wireless power transfer to charge a battery system of a wirelessly chargeable equipment;
detecting, by the system, that the wirelessly chargeable equipment is within a power transfer range of the optical beamforming transmitter;
tracking, by the system, movement of the wirelessly chargeable equipment;
determining, by the system, that the wirelessly chargeable equipment includes an adjustable laser photodetector;
providing, by the system, an adjustment instruction to the wirelessly chargeable equipment to command the adjustable laser photodetector of the wirelessly chargeable equipment to reorient towards the optical beamforming transmitter;
determining, by the system, a charge criticality indicator associated with the wirelessly chargeable equipment; and
activating, by the system, based at least in part on the charge criticality indicator associated with the wirelessly chargeable equipment, the optical beamforming transmitter to provide wireless power transfer via a laser beam to the wirelessly chargeable equipment while the wirelessly chargeable equipment is within the power transfer range, wherein activating the optical beamforming transmitter comprises adjusting a time interval between pulses of the laser beam based at least in part on the charge criticality indicator associated with the wirelessly chargeable equipment.

9. The method of claim 8, further comprising obtaining a current charge profile corresponding to the wirelessly chargeable equipment, wherein the current charge profile includes the charge criticality indicator and a current charge level.

10. The method of claim 8, further comprising determining whether the wirelessly chargeable equipment is authorized to receive the wireless power transfer.

11. The method of claim 8, further comprising:
prior to the wirelessly chargeable equipment leaving the power transfer range, generating a charge preparation command that is directed to a downstream wireless power transfer assembly that is located outside of the power transfer range; and
providing the charge preparation command to the downstream wireless power transfer assembly that is located outside of the power transfer range.

12. The method of claim 11, wherein the charge preparation command instructs the downstream wireless power transfer assembly to prepare to provide wireless power transfer for the wirelessly chargeable equipment.

13. The method of claim 8, wherein the optical beamforming transmitter is activated responsive to confirming a direct line of sight with the wirelessly chargeable equipment.

14. A computer storage medium having computer-executable instructions stored thereon that, in response to execution by a processor of a system comprising an optical beamforming transmitter, causes the processor to perform operations comprising:
receiving a power charge message that requests wireless power transfer to charge a battery system of a wirelessly chargeable equipment;
detecting that the wirelessly chargeable equipment is within a power transfer range of the optical beamforming transmitter;
tracking movement of the wirelessly chargeable equipment;
determining that the wirelessly chargeable equipment includes an adjustable laser photodetector;
providing an adjustment instruction to the wirelessly chargeable equipment to command the adjustable laser photodetector of the wirelessly chargeable equipment to reorient towards the optical beamforming transmitter;
determining a charge criticality indicator associated with the wirelessly chargeable equipment; and
activating, based at least in part on the charge criticality indicator associated with the wirelessly chargeable equipment, the optical beamforming transmitter to provide wireless power transfer via a laser beam to the wirelessly chargeable equipment while the wirelessly chargeable equipment is within the power transfer range, wherein activating the optical beamforming transmitter comprises adjusting a time interval between pulses of the laser beam based at least in part on the charge criticality indicator associated with the wirelessly chargeable equipment.

15. The computer storage medium of claim 14, wherein the operations further comprise obtaining a current charge profile corresponding to the wirelessly chargeable equipment, and wherein the current charge profile includes the charge criticality indicator and a current charge level.

16. The computer storage medium of claim 14, wherein the operations further comprise:
prior to the wirelessly chargeable equipment leaving the power transfer range, generating a charge preparation command that is directed to a downstream wireless power transfer assembly that is located outside of the power transfer range; and
providing the charge preparation command to the downstream wireless power transfer assembly that is located outside of the power transfer range.

17. The computer storage medium of claim 14, wherein the optical beamforming transmitter is activated responsive to confirming a direct line of sight with the wirelessly chargeable equipment.

\* \* \* \* \*